US00RE35515E

United States Patent [19]

Taniguchi et al.

[11] E Patent Number: Re. 35,515

[45] Reissued Date of Patent: May 20, 1997

[54] PHOTO SIGNAL PROCESSING APPARATUS

[75] Inventors: Nobuyuki Taniguchi, Nishinomiya; Toshihiko Ishimura, Habikino; Norio Ishikawa, Osaka; Reiji Seki, Sakai; Yasuaki Akada, Osaka, all of Japan

[73] Assignee: Minolta Camera Kabushiki Kaisha, Osaka, Japan

[21] Appl. No.: 163,588

[22] Filed: Dec. 6, 1993

Related U.S. Patent Documents

Reissue of:

[64] Patent No.: 4,920,370
Issued: Apr. 24, 1990
Appl. No.: 29,755
Filed: Mar. 24, 1987

U.S. Applications:

[63] Continuation of Ser. No. 871,721, Apr. 20, 1992, abandoned.

[30] Foreign Application Priority Data

| | | | |
|---|---|---|---|
| Mar. 25, 1996 | [JP] | Japan | 61-66670 |
| Mar. 25, 1996 | [JP] | Japan | 61-66671 |
| Mar. 25, 1996 | [JP] | Japan | 61-66672 |
| Mar. 25, 1996 | [JP] | Japan | 61-66673 |

[51] Int. Cl.[6] ..... G03B 13/36; G03B 3/00

[52] U.S. Cl. ..... 396/96; 396/135; 396/246

[58] Field of Search ..... 354/400, 402, 354/406, 407, 409, 412

[56] References Cited

U.S. PATENT DOCUMENTS

| | | | |
|---|---|---|---|
| 4,387,975 | 6/1983 | Araki . | |
| 4,460,257 | 7/1984 | Ogasawara | 354/402 |
| 4,550,993 | 11/1985 | Taniguchi et al. . | |
| 4,575,212 | 3/1986 | Kitaura et al. | 354/409 |
| 4,609,274 | 9/1986 | Iwashita et al. | 354/400 |
| 4,660,955 | 4/1987 | Ishida et al. . | |
| 4,671,640 | 6/1987 | Akada et al. | 354/402 |

FOREIGN PATENT DOCUMENTS

| | | |
|---|---|---|
| 58-172628 | 7/1975 | Japan . |
| 60-107011 | 11/1982 | Japan . |

OTHER PUBLICATIONS

U.S. Patent Application Ser. No. 819,865.

*Primary Examiner*—Russell E. Adams
*Attorney, Agent, or Firm*—Price, Gess & Ubell

[57] ABSTRACT

A photo signal processing apparatus which comprises a light receiving unit of charge accumulation type for outputting a data corresponding to a condition of light received thereby, a data processor for applying a predetermined processing to the data outputted from the light receiving unit, an accumulation initiating device for causing the light receiving unit to initiate a charge accumulating operation, an accumulation interrupting device for interrupting the charge accumulating operation of the light receiving unit, a counter for counting a time passed during a period subsequent to the start of the charge accumulating operation of the light receiving unit and until the termination of the charge accumulating operation of the light receiving unit, and a control unit for activating the accumulation initiating device at a timing required to interrupt the charge accumulating operation of the light receiving unit at the time of termination of the data processing performed by the data processor.

11 Claims, 14 Drawing Sheets

| | | |
|---|---|---|
| Fig. 3 (a) | Fig. 3 (b) | Fig. 3 (c) |

PHOTO SIGNAL PROCESSING APPARATUS

Matter enclosed in heavy brackets [ ] appears in the original patent but forms no part of this reissue specification; matter printed in italics indicates the additions made by reissue.

*This is a continuation of application Ser. No. 07/871,721, filed on Apr. 20, 1992, for a PHOTOSIGNAL PROCESSING APPARATUS, now abandoned which is a reissue application of U.S. Pat. No. 4,920,370.*

BACKGROUND OF THE INVENTION

1. Field of the Invention

The present invention generally relates to a photo signal processing apparatus and, more particularly, to a photo signal processing apparatus utilizing a charge accumulation type light receiving unit such as, for example, a charge coupled device (CCD), including a plurality of photosensor elements for receiving light, which is operable to perform data processing based on data fed from the light receiving unit.

2. Description of the Prior Art

This type of photo signal processing apparatus is disclosed, for example, in the Japanese Laid-open Patent Publication No. 60-125817. According to this publication, when accumulation completes in the light receiving unit of charge accumulation type, the next succeeding accumulating operation is performed. However, a data processing means for carrying out data processing in response to data from the light receiving unit does not accept any data from the light receiving unit during the data processing.

In such case, even if the accumulation of the light receiving unit completes during the data processing of a previous accumulation because a target object is of high brightness, the data resulting from the completion of the accumulation will not be inputted in overlapping relationship with the data processing of the previous accumulation data occurring parallel to this accumulation. It is only where the accumulation of the light receiving unit requires a relatively long time because of the low brightness of the target object, that the charge accumulation for the next data processing can be carried out during the data processing of the previous accumulation so that the time required to complete a single focus detecting operation can be rendered to be smaller than the sum of the charge accumulating time of the light receiving unit and the data processing time.

However, according to the prior art data processing apparatus of the type described hereinabove, as shown in FIG. 14 of the accompanying drawings, in the event that the charge accumulation 3 and 6 of the light receiving unit takes place parallel to a final stage of the data processing 1 and 2, but occurs shortly before the termination of the data processing 1 and 2, a signal associated with the charge accumulation 3 and 6 cannot be utilized because the data processing 1 and 2 has not yet been terminated. Therefore the next succeeding data processing 2 and 3 can only be initiated in response to a signal associated with the subsequent charge accumulation 4 and 7.

Because of the above, it often happens that the signal data processing cycle tdc is equal to or substantially equal to the sum of the time ti required for the charge accumulation of the light receiving unit and the time Td required for the data processing, and, therefore, the data processing speed at the time the data processing is repeatedly carried out tends to be lower than possible.

SUMMARY OF THE INVENTION

Accordingly, the present invention has been devised to substantially eliminate the above described problems inherent in the prior art and has for its one object to provide an improved photo signal processing apparatus reliable in operation.

According to one preferred embodiment of the present invention, the photo signal processing apparatus is featured in the provision of, a light receiving unit of charge accumulation type, a data processing means for performing a data processing based on data from the light receiving unit, an accumulation initiating means for causing the light receiving unit to initiate an accumulation operation, an accumulation interrupting means for causing the light receiving unit to interrupt the accumulation operation, a count means for counting the time elapsed subsequent to the start of the accumulating operation of the light receiving unit and until the completion of the accumulating operation, and an accumulation start control means for operating the accumulation initiating means at a timing required to terminate the accumulating operation of the light receiving unit by causing the accumulation interrupting means at the time of completion of the data processing on the basis of a data from the count means.

According to the foregoing arrangement, the light receiving unit starts the first accumulation by the action of the accumulation initiating means in response to a command from the accumulation start control means, and interrupts the first accumulation by the action of the accumulation interrupting means when a predetermined saturated condition is reached. At this time, the data processing means receives a signal associated with the first accumulation to perform a first data processing. The accumulation time Til required for the light receiving unit to complete the first accumulation corresponds to brightness conditions of the target object from which the light receiving unit receives light and provides a reference time required for the accumulation at the time of the subsequent light receipt. This accumulation time Til is counted by the count means which receives from the accumulation initiating means and the accumulation interrupting means respective signals representative of the start and termination of the first accumulation of the light receiving unit, a count signal thereafter supplied to the accumulation start control means.

The accumulation start control means which has received the count signal makes use of a required processing time Td predetermined by the data processing means to determine a charge accumulation starting time Ts required to terminate the second accumulation taking place in parallel to the first data processing, preferably at a timing Te delayed a little from the completion of the first data processing (an extra time taken for safety purpose in order to accommodate normal change in brightness of the target object to a higher value). In sum, the accumulation start control causes the light receiving unit to start the accumulation for the second data processing while causing the accumulation initiating means to operate at the timing Ts during the first data processing Ts having been calculated to the basis of that first charge accumulating time.

Thereafter, the accumulation start control means causes the subsequent third, fourth, . . . charge accumulation for the succeeding third, fourth . . . data processing during the subsequent second, third . . . data processing at the timing Ts calculated on the basis of the charge accumulating time Ti2, Ti3, . . . for the second, third. . . . accumulation that has taken place during the previous first, second, . . . data processing.

In this way, in the light receiving unit, the accumulation for the succeeding second, third, fourth, . . . data processing essentially takes place one time during the preceding first, second, third, . . . data processing and terminates at a predetermined timing Te after the termination of the first, second, third, . . . parallel data processing so that the accumulation data can be utilized during the next succeeding second, third, fourth, . . . data processing.

Accordingly, while the cycle time T of the initial data processing is equal to the sum of the accumulating time Til and the data processing time Td, the subsequent data processing time Tdc is equal to the lesser sum of the data processing time Td and the time ΔT the lapse of time between the end of the data processing time Td and the termination of the subsequent accumulation delayed therefrom, T is relatively small as compared to the data processing time Td. Accordingly, when the data processing is repeatedly performed, the data processing speed is nearly optimal. Since the accumulation of the light receiving unit and the data processing based thereon correspond to each other on a 1-to-1 basis, the problems of the signal from the light receiving unit being repeatedly used or no signal obtained are avoided.

Also, since the data processing for each time is carried out on the basis of the updated charge accumulation time Til. . .n resulting from the charge accumulation performed by the light receiving unit during the previous data processing, even when the brightness condition of the target object varies, so long as within a normal range, there is no possibility that the accumulation start timing during which the accumulation start control means performs a calculation for the next succeeding data processing would not match with an actual situation. Therefore, it is possible to substantially avoid any possible deviation in timing beyond a tolerance between the time of termination of the first, second, third, . . . data processing and the time of termination of the second, third, fourth, . . . accumulation of the light receiving unit parallel thereto.

Another object of the present invention is to provide an automatic focusing device for a camera having a light receiving unit of charge accumulation type, in which the automatic focusing operation can be performed more precisely and more quickly in comparison with a conventional device, for example, as disclosed in Japanese Laid-Open Patent Application No. 60-107011.

Another object of the present invention is to provide a sequence control device for a camera having a light receiving unit of charge accumulation type, in which data processing for automatic focusing control and data processing for automatic exposure control are sequentially controlled by a single microprocessor which also controls the charge accumulation of the light receiving unit.

A further object of the present invention is to provide a sequence control device for a camera, in which data processing for automatic control and data processing for automatic exposure control can be quickly and precisely performed by a single microprocessor in comparison with a conventional device, for example, as disclosed in Japanese Laid-Open Patent Application No. 60-107011.

BRIEF DESCRIPTION OF THE DRAWINGS

These and other objects and features of the present invention will become clear from the following description of the preferred embodiments read with reference to the accompanying drawings, in which:

FIGS. 2 to 11 are flow charts showing the sequence of operation of the embodiment shown in FIG. 1, wherein FIG. 2 is a main routine;

FIG. 3 is a flow chart showing the flow from an interruption process to an AF data processing.

FIG. 4 is an AF routine;

FIG. 5 is a PF routine;

FIG. 6 is a low contrast routine;

FIG. 7 is an event counter interruption processing routine;

FIG. 8 is an accumulation subroutine;

FIG. 9 is a switch discriminating subroutine;

FIG. 10 is a motor stop subroutine and;

FIG. 11 is a termination discriminating subroutine;

DETAILED DESCRIPTION OF THE EMBODIMENTS

Figure 1:
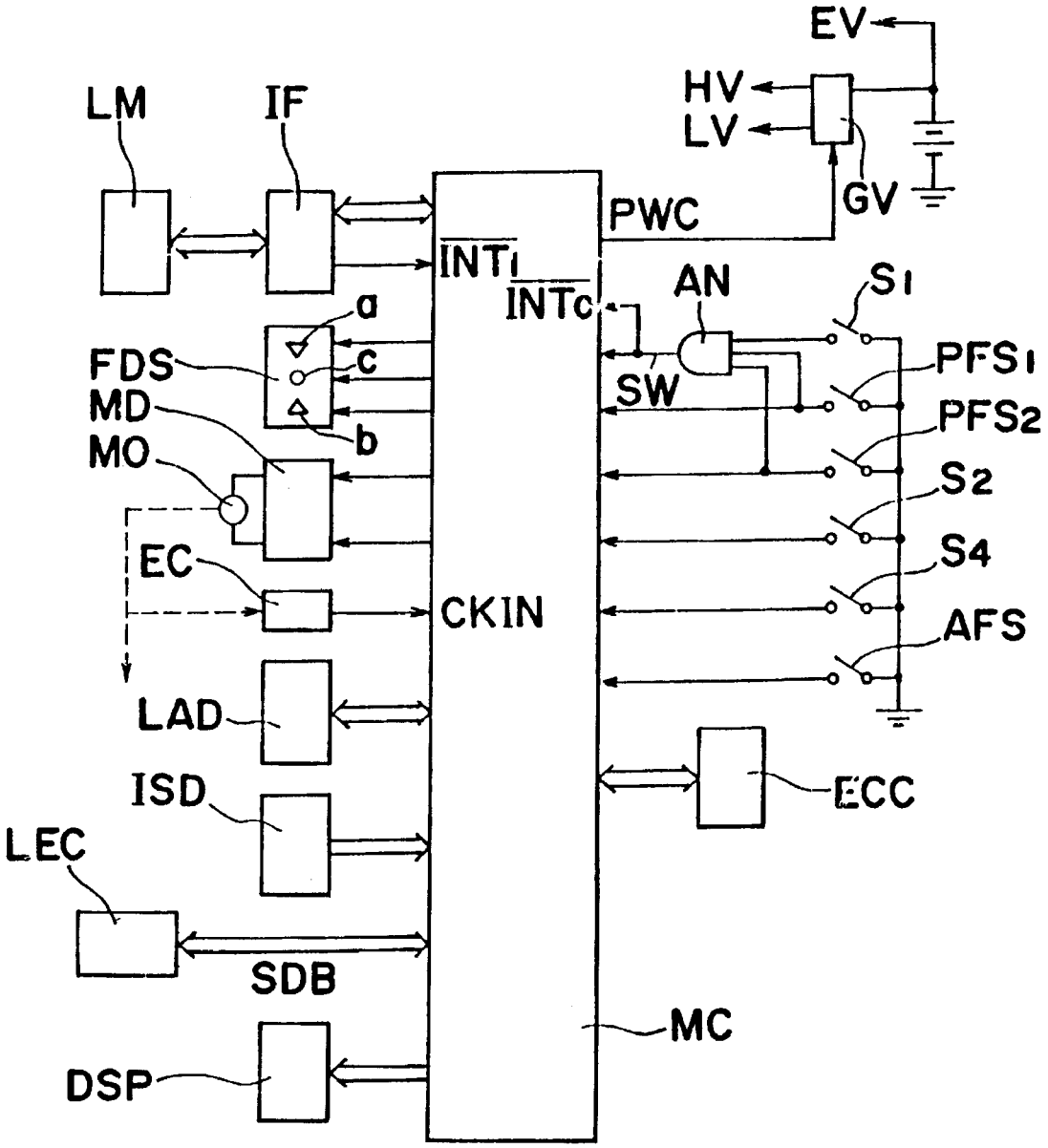
FIG. 1 is a system block diagram showing one embodiment of the present invention.

One embodiment wherein the present invention is applied to an auto-focus camera of TTL (through-the-lens) light measuring system will be described with reference to FIGS. 1 to 11.

The photographic camera in the illustrated embodiment, has, in combination with a function of automatic exposure (hereinafter referred to as "AE"), two capabilities of auto-focusing (hereinafter referred to as "AF") and power focusing (hereinafter referred to as "PF").

The system outline of such camera will first be described with particular reference to FIG. 1.

The camera is equipped with a microcomputer MC to which an AE control unit ECC for the AE, a light measuring circuit and analog-to-digital (A/D) converter LAD for the AE control, a film sensitivity output unit ISD, a lens circuit LEC for supplying various data peculiar to a particular lens to the microcomputer MC through a serial data bus SDB, and others are connected. Based on necessary input data from the light measuring circuit and A/D converter LAD, the film sensitivity output unit ISD, the lens circuit LEC and the others, the AE control unit ECC is controlled by the microcomputer MC to perform an AE operation. At the same time, a liquid crystal display unit DSP connected with the microcomputer MC displays exposure control data. The A/D conversion in the light measuring circuit and A/D converter LAD is cyclically carried out and is brought in position ready to receive data from the microcomputer MC at any time subsequent to the completion of the first A/D conversion.

A switch S1 connected with the microcomputer MC is closed upon the first stage of depression of a shutter release button to activate the light measuring circuit and A/D converter LAD. A switch S2 is closed upon the second state of depression of the shutter release switch. A switch S4 is opened upon the completion of a shutter charging.

For the purpose of AF and PF, a motor drive circuit MD and a motor MO for driving a focusing lens of a photographic lens is connected with the microcomputer MC. The motor drive circuit MD is controlled by the microcomputer MC on the basis of data fed from a one-dimensional line sensor LM, such as, for example, CCD (charge-coupled device), connected with the microcomputer MC, an encoder EC for monitoring the lens drive amount, the lens circuit LEC and others. The focusing under any one of AF and PF modes is carried out in such a way as to shift the lens in backward direction when in a front focus condition and to shift the lens in forward direction which in a rear focus condition. At the same time, a focusing display unit FDS connected with the microcomputer MC displays a focusing condition.

Pulses from the encoder EC are inputted through a CKIN terminal of the microcomputer MC to an internal event counter EVC (as will be described later) of the microcomputer MC, and in dependence on the number of the pulses the event counter EVC is counted down.

The focusing display unit FDS includes three display segments a, b, and c. Any one of them is turned on for displaying the focusing condition of the photographic lens under the PF mode. For example, either one of the display segments a and b is turned on when the front-focus condition and rear-focus condition is detected under the PF mode, respectively. The display segment c is turned on when the in-focus condition is detected. On the other hand, even though the display segment c is turned on when the in-focus condition is detected under the AF mode, the other display segments a and b are not turned on even if the front-focus condition or the rear-focus condition is detected. In the event that no focus detection is possible in AF mode because of a low contrast of the target object, both of the display segments a and b, indicative of the front and rear focus conditions, respectively, are energized to blink. Should the lens be moved to an infinity position or to a closest available position either, the display segment a, conforming to the direction of shifting the lens towards the infinity position, or the display segment b, conforming to the direction of shifting the lens towards the closest available position, is energized to blink, respectively.

The one-dimensional line sensor LM is of a charge accumulation type and is operable to accumulate, in response to the receipt of light from a target object, a charge necessary for the data processing upon completion of a charge accumulation, an interruption signal relative to the control of the microcomputer MC is inputted from an interface circuit IF to an interruption terminal INT1 of the microcomputer MC.

The details of the one-dimensional line sensor LM and the interface circuit IF are disclosed in, for example, the Japanese Laid-open Patent Publication No. 60-101516.

A switch AFS connected with the microcomputer MC is a selector switch for selecting either AF or PF mode. The AF and PF modes can be selected when this switch AFS is closed and opened, respectively. Hence, unless the AF mode is chosen, the PF mode is always possible. In PF mode, only by depressing one the PF switches PFS1 and PFS2 determinative of different directions in which the lens is driven one at a time, can a PF operation be caused to occur in one of the directions. The PF switches shift the lens in a backward direction when the PF switch PFS1 is closed and shift the lens in a forward direction when the PF switch PFS2 is closed.

While the PF switches PFS1 and PFS2, the shutter release switch S2 and the switch S4 are all connected direct to the microcomputer MC, the light measuring switch S1 is, together with respective shunt input lines from the PF switches PFS1 and PFS2, connected as a switching line SW to the microcomputer MC through an AND gate AN, and a shunt line from the switching line SW is connected to an interruption terminal $\overline{INT0}$ of the microcomputer MC.

It is to be noted that the microcomputer MC has a counter interrupting function for enabling a counter interruption when the count is zero as a result of the count-down of the event counter EVC and also a timer-I interrupting function of enabling a timer interruption when the content of a timer I (as will be described later) is counted down to zero from a preset value in response to internal clocks. A power source GV has an output line HV which feeds an electric power to both of the one-dimensional line sensor LM and the interface circuit IF, and another output line LV which feeds an electric power to the light measuring circuit and A/D converter LAD. The power source GV starts its electric power supplying operation when a power source control signal PWC fed from the microcomputer MC is rendered to be "Low". It is to be noted that reference character EV represents an electric power supply line for supplying an electric power to circuits other than the above described circuits.

The control operation performed by the microcomputer MC in the camera system outlined above is as shown in the flowcharts of FIGS. 2 to 11, reference to which will not be made.

Various controls performed by the microcomputer MC according to these flowcharts will be explained. When one of the switches S1, PFS1 or PFS2 shown in FIG. 1 is closed, the output of the AND gate AN is rendered to be "Low" with the consequence that the terminal $\overline{INT0}$ is applied with an interruption signal and the microcomputer MC starts its operation executing a main routine shown in FIG. 2. As shown therein, and subsequent to the interruption, the power source GV is activated at step #1, the one-dimensional line sensor LM is then initialized (to clear charges from a charge accumulating unit and a transfer unit in the CCD) at step #2, and a timer II (as will be described later) is reset and started at step #3, followed by the resetting of various flags (including registers) at step #4.

At subsequent step #5, an accumulating subroutine is executed to cause the line sensor LM to start its accumulation. The details of this accumulating subroutine are shown in FIG. 8.

Figure 8:
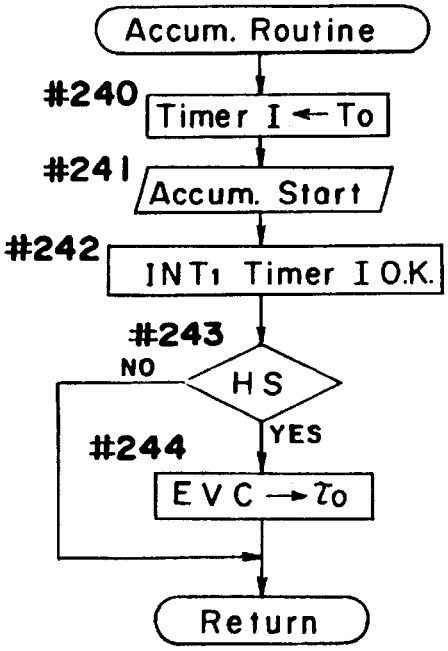

Upon the start of the subroutine of FIG. 8, and at step #240, the timer I is preset with the maximum charge accumulating time To of the line sensor LM, followed by the start of accumulation at step #241. At subsequent step #242, the interruption of the terminal $\overline{INT1}$ caused by a completion of the accumulation incident to the attainment of a saturated condition by the line sensor LM is enabled. The interruption of the timer I as a result of the passage of the maximum charge accumulating time To is also enabled.

Accordingly, the accumulation can be halted either by the interruption $\overline{INT1}$ resulting from the monitoring of the charge accumulation or by the interruption of the timer I resulting from the passage of the maximum charge accumulating time To, the details of which are disclosed in, for example, U.S. Pat. No. 4,550,993.

At step #243, a decision is made to determine if the motor MO for shifting the lens is in a predetermined high speed condition HS. If the motor MO is in the predetermined high speed condition HS, it means the accumulation started during the shifting of the lens and, therefore, the contents of the event counter EVC at the time of starting the accumulation is set in a register $\pi 0$, followed by the return to the main routine.

In the accumulation subroutine, charge accumulation can be started only if the rotational speed of the motor MO is stabilized, namely the motor MO is in the predetermined high speed condition HS. The reason will be explained below in detail.

In the embodiment, the charge accumulation and the subsequent focusing condition calculation are performed in parallel with a shifting of the lens so as to shorten the time required for an automatic focusing operation. If the shifting speed of the lens changes during the charge accumulation, it is impossible to precisely calculate the shifting amount of the lens that occurs during the charge accumulation. Therefore, the charge accumulation is started only when the rotational speed of the motor MO is stabilized. In order to calculate the shifting amount of the lens that occurs during the charge accumulation, the contents of the event counter EVC at the time of starting the charge accumulation are set in the register π0 at step #244.

Figure 2:
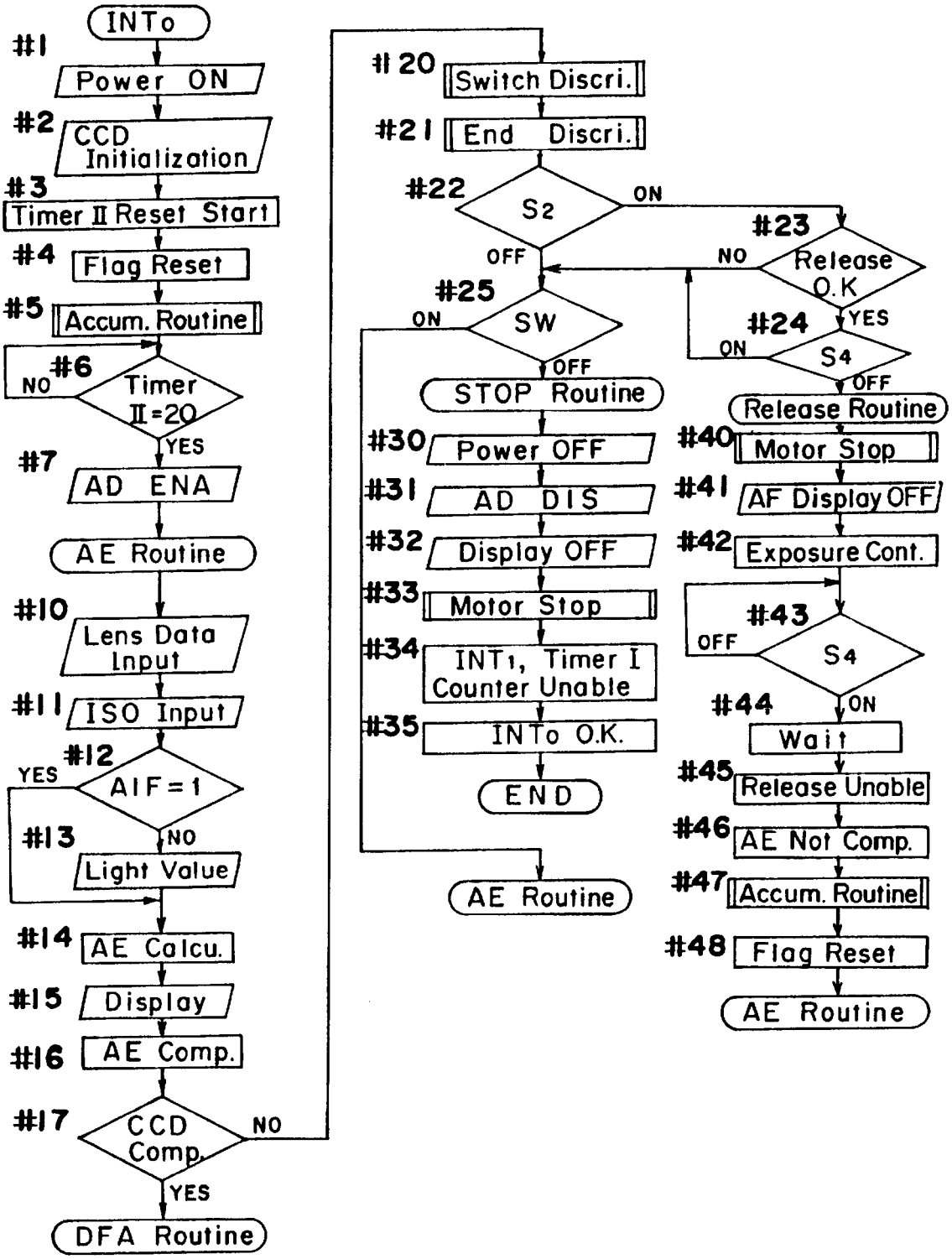

Should the motor MO not be in the predetermined high speed condition, there is no concern with lens shifting for AF operation, and therefore, the program returns from step #243 to step #6 of the main routine without step #244 effected. Referring to FIG. 2, and at step #6, a decision is made to determine if the content of the timer II has exceeded 20msec., and if the timer II has not yet exceeded 20msec., a wait condition is resumed. During this wait condition, the light measuring circuit is stabilized. Once an excess over 20msec. has been confirmed at step #6, the program flow proceeds to step #7 at which time the A/D converting operation is enabled so that the A/D conversion can take place cyclically. Then, an AE routine is executed subsequent to step #7.

The AE routine starts from step #10 at which time lens data is inputted from the lens circuit LEC through the serial data bus SDB. At subsequent step #11, film sensitivity data (ISO) of the film is inputted from the film sensitivity output unit ISD.

Then, if a flag AIF is "0", a measured light value is inputted, but if it is "1", corresponding to no measured light value being inputted, the program flow proceeds to step #14 at which an exposure calculation is carried out.

Figure 4:
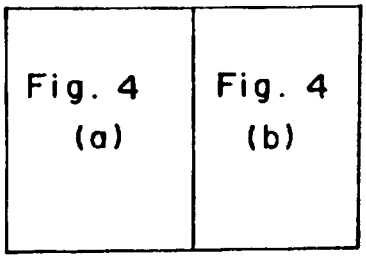
Figure 4:
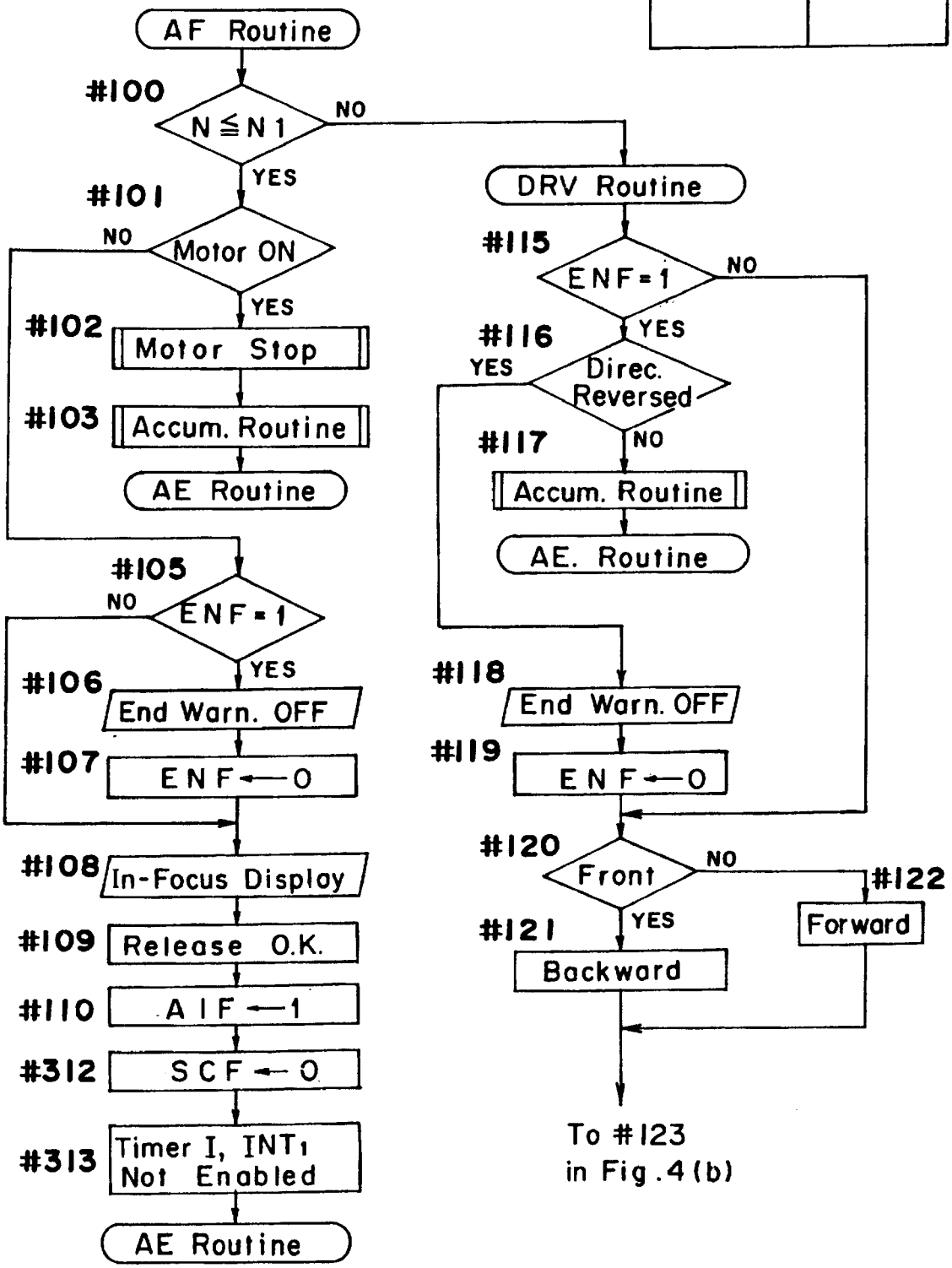
Figure 4B:
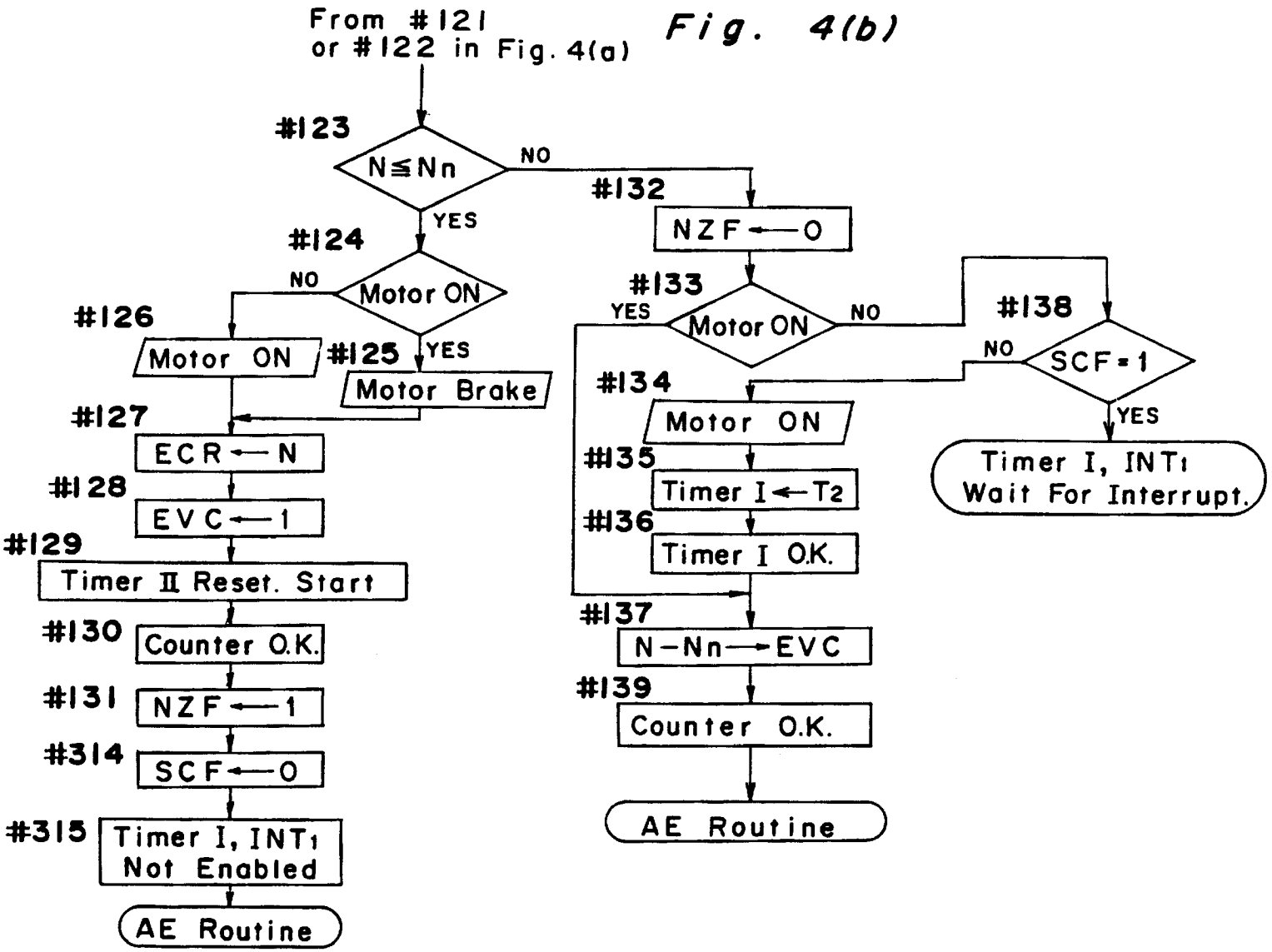

The flag AIF is provided for indicating that automatic focusing operation has been completed in the AF mode. When the automatic focusing operation including the focusing condition detection and the lens shifting operation is terminated (called focus lock) in response to the in-focus detection in the AF mode, the flag AIF is set to "1" at step #110 in FIG. 4. This focus lock is shown in FIG. 4, as the program proceeds from step #105 to AE routine without starting the charge accumulation. Furthermore, if the flag AIF is discriminated to be set to "1" at step #12, the following step #13 is skipped. Therefore, if the focus lock is performed in the AF mode, the light value is not inputted to the microcomputer MC. Thus, the light value already inputted under AF mode is locked in the microcomputer MC (called AE lock).

Figures 5, 5A:
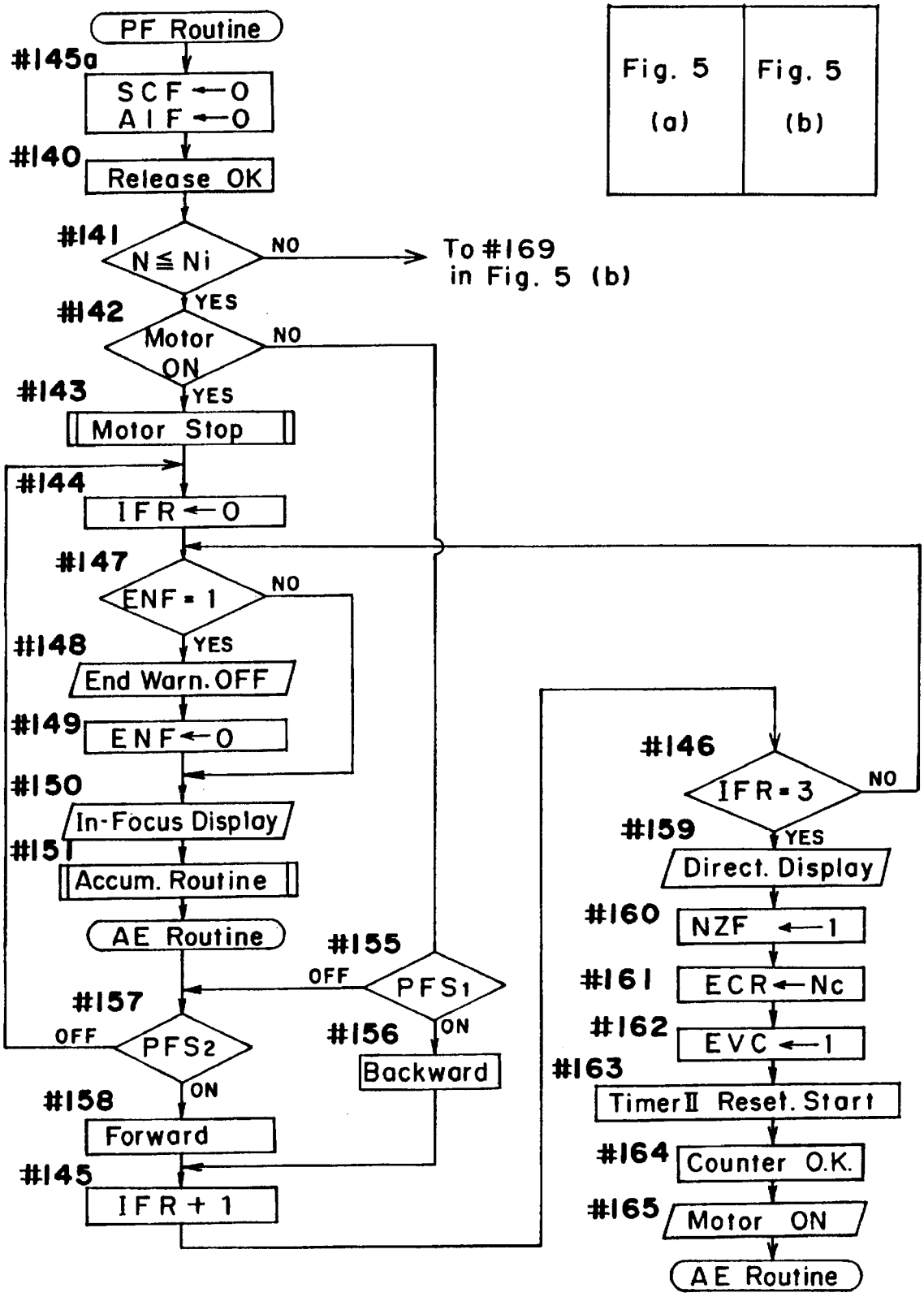
Figure 5B:
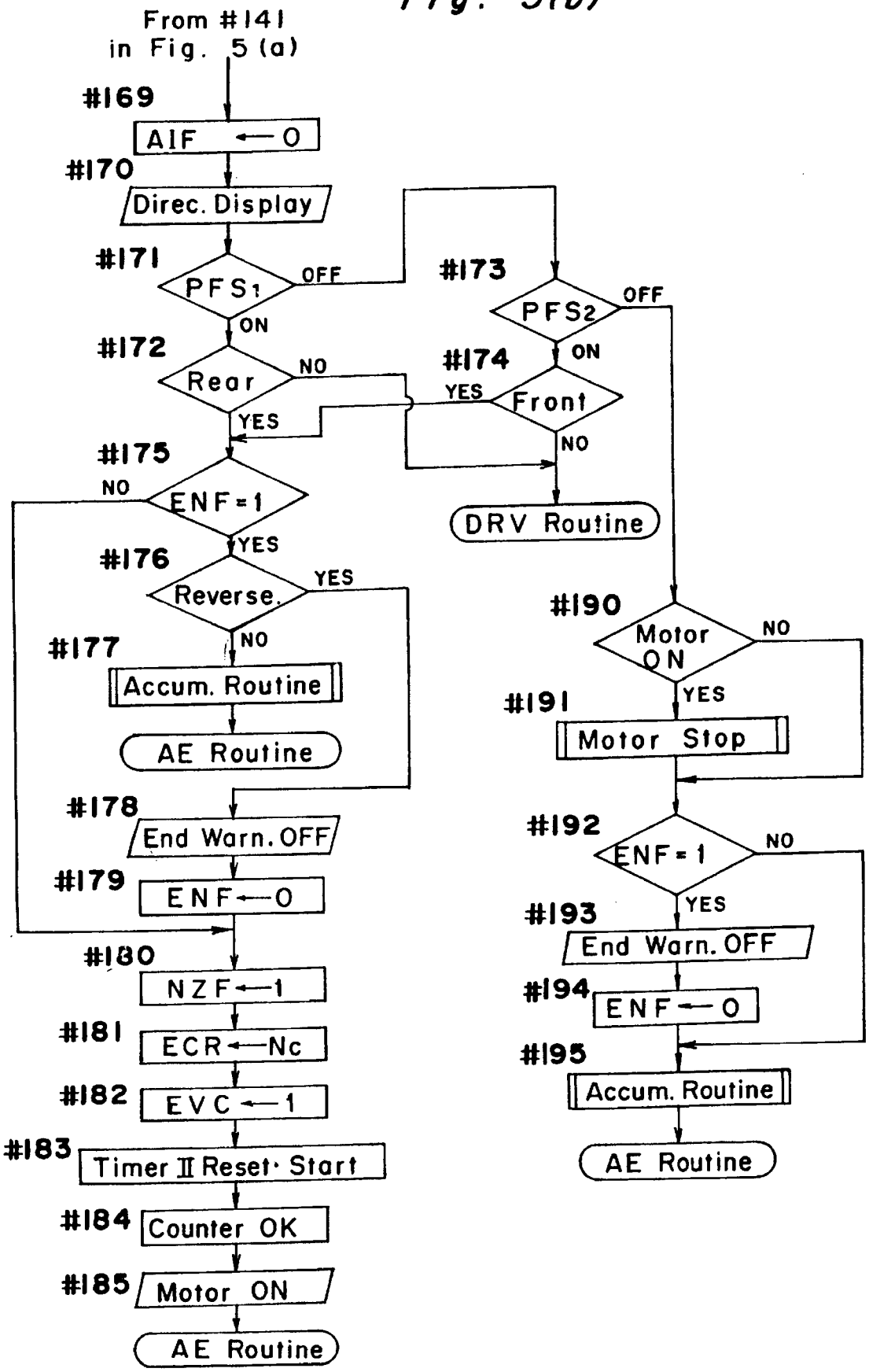

On the other hand, no focus lock is effected under the PF mode even when the in-focus condition is detected (see FIG. 5, PF routine). To shift to the AE routine after the accumulation subroutine is performed at step #151, the flag AIF is set to "0" (at step #145a in PF routine of FIG. 5) in order to permit the measured light value to continually be inputted so that, even though the sutter release operation is started, the AE control can be effected according to a result of the AE calculation based on the latest measured light value.

After the AE calculation at step #14 in FIG. 2, the result of the AE calculation is displayed through the display unit DSP at step #15.

Then, after a flag "AE Completion" indicative of the completion of the AE calculation has been set to "1" at step #16, a decision is made at step #17 to determine whether or not a flag "CCD Completion" associated with the completion of the accumulating operation of the line sensor LM has been set.

In the preferred embodiment, data processing for automatic focus detection and data processing for automatic exposure control are performed sequentially in a single microprocessor MC at different timings. Namely, the data processing for automatic exposure control is performed from step #10 to step #15 in FIG. 2, while the data processing for automatic focus detection, necessary for both the AF mode and the PF mode, is performed in the DFA routine shown in FIG. 3 to the AF routine shown in FIG. 4 or to the PF routine shown in FIG. 5. The charge accumulation is repeated in parallel with the data processing for automatic focus detection and the data processing for automatic exposure control. Therefore, the time required only for the charge accumulation of the line sensor LM is not provided for. Thus, the accomplishment of a high speed operation until the shutter release operation is enable, depends on a problem of whether processing should be selected after the charge accumulation is completed, between the data processing for automatic focus detection and the data processing for automatic exposure control. The step #17 in FIG. 2 is provided as a countermeasure against the above problem.

This countermeasure is achieved as follows: in a flow of the process subsequent to the INT1 interruption shown in FIG. 3, executed when the interruption of the terminal INT1 is enabled upon completion of the accumulation at step #242 of the accumulating routine of FIG. 8, data from the line sensor LM for which accumulation has been completed is dumped at step #58 for the calculation of the AF data processing routine DFA; and after a decision has subsequently been made at step #59 to determine whether or not the flag "AE Completion" set in accordance with the AE completion at step #16 has been set up: the AF data processing routine DFA is immediately resumed if the flag "AE Completion" has been set up, but if the flag "AE Completion" has not been been set up, the program flow returns to the AE routine of FIG. 2 and, then after the remaining processes have been executed, shifts to the AF data processing routine DFA.

Figures 3, 3A:
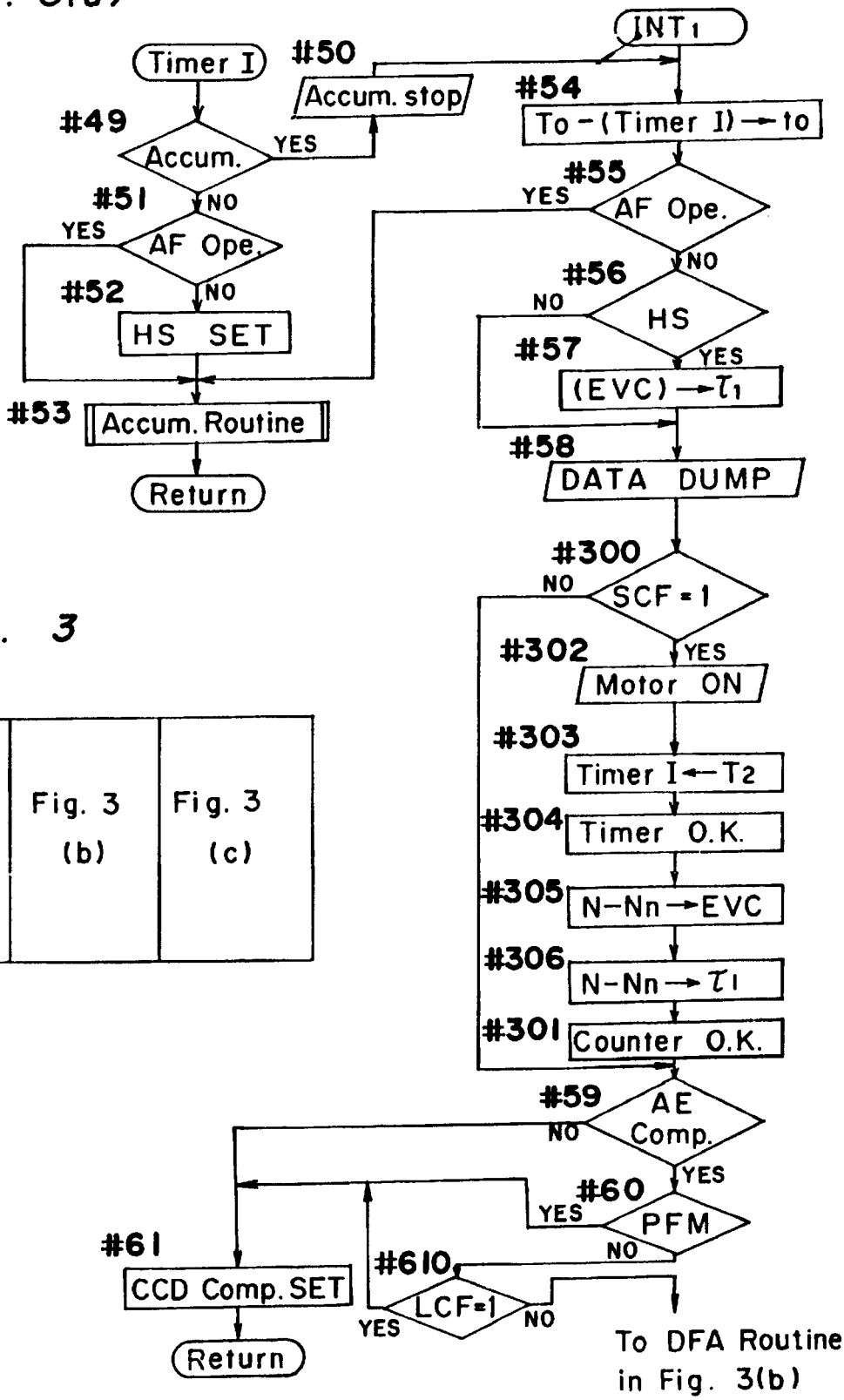
Figure 3B:
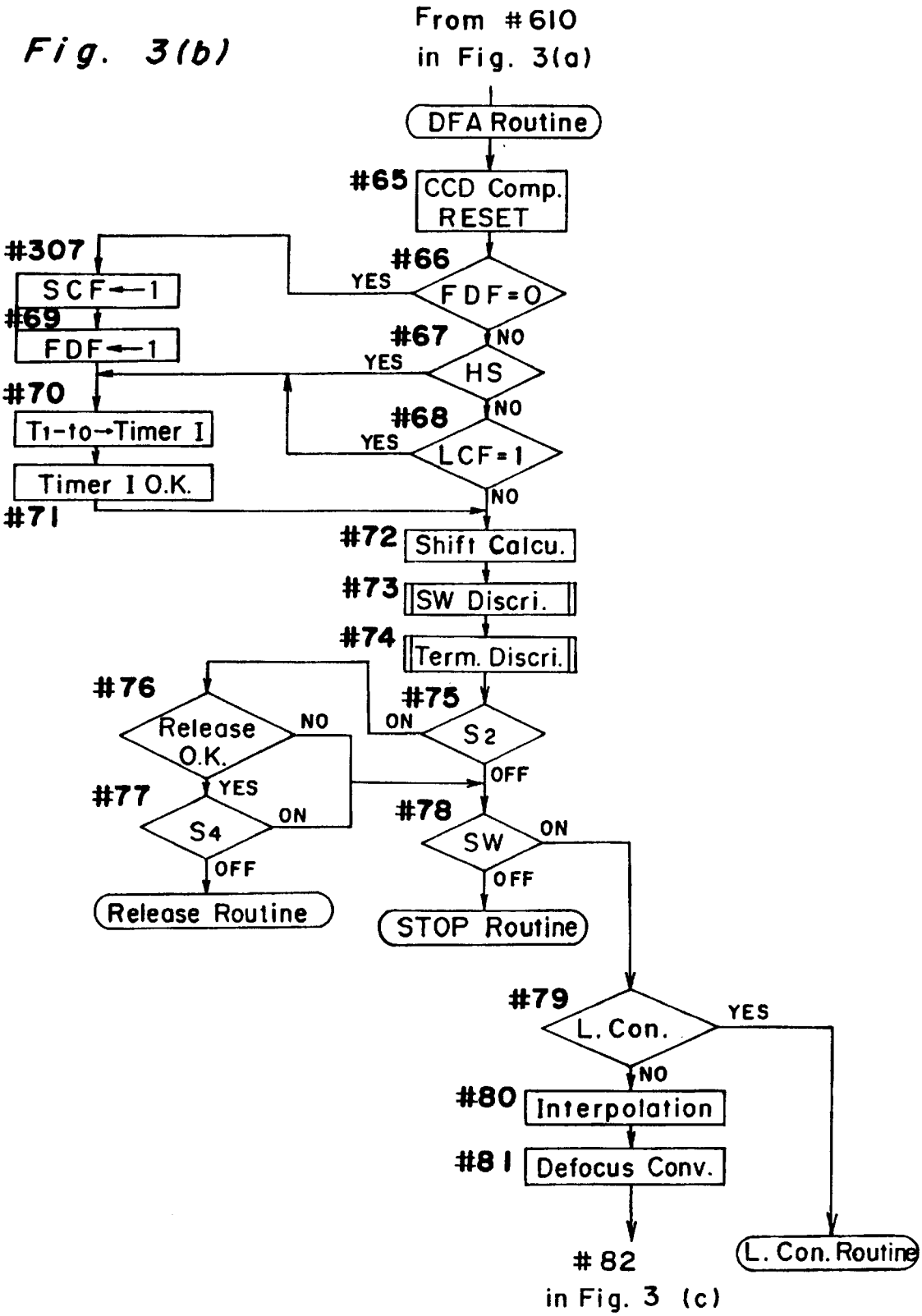
Figure 3C:
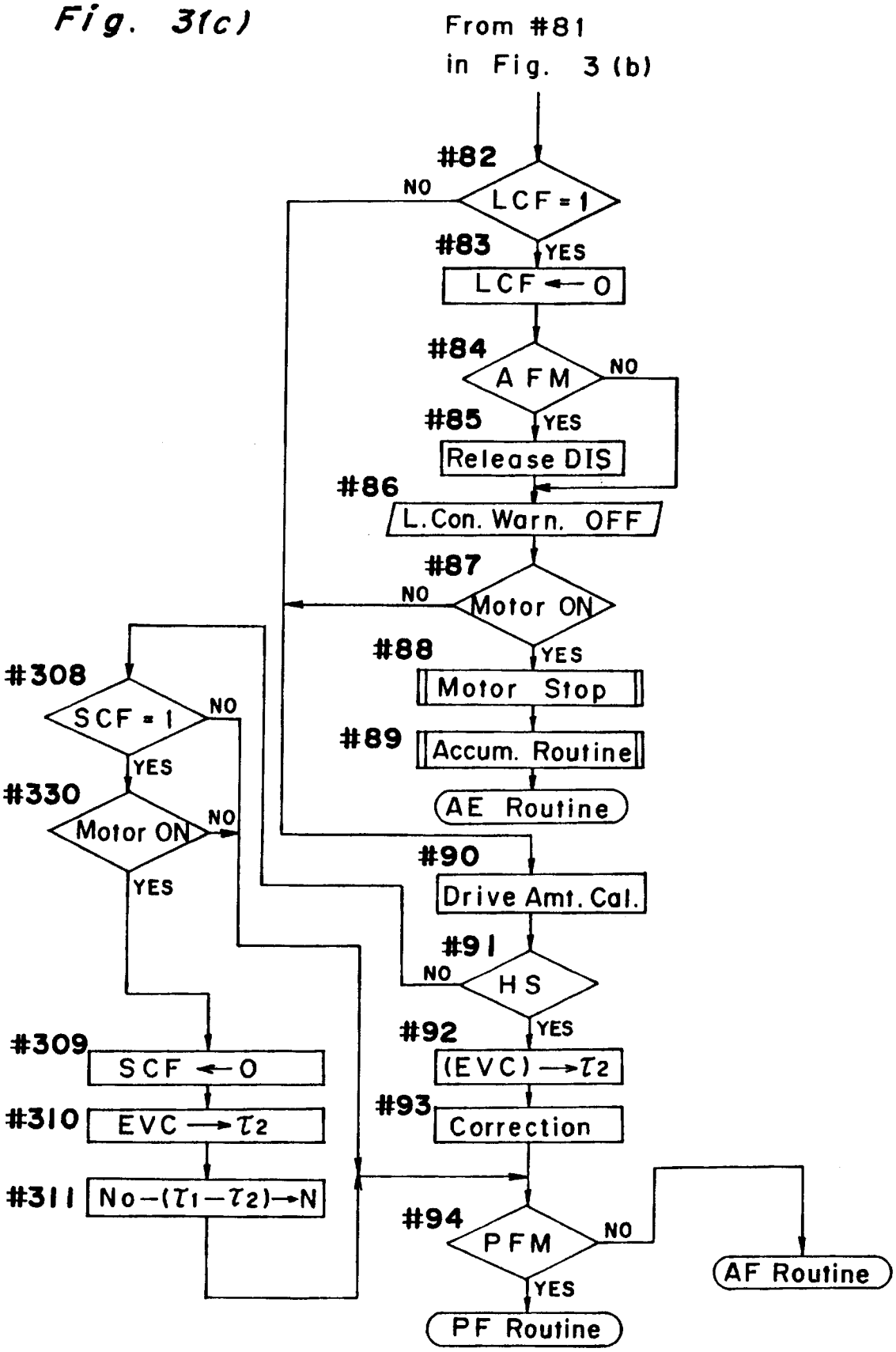

Therefore, arrangement has been made so that when in the AE routine of FIG. 2, the AE operation has been completed, since the program flow needs to be shifted immediately to the AF data processing routine DFA of FIG. 3. If the AE completion resulted after the return to the AE routine as a result of the AE incompletion subsequent to the dumping of data, a flag "CCD Completion" associated with the completion of the dumping of the accumulated data is set up at a step #61 in the course of a line returning to the AE routine of FIG. 2 subsequent to the determination at step #59 (FIG. 3) of the AE incompletion. Depending on whether or not that flag "CCD Completion" has been set up at step #17 of FIG. 2 the operational status of said AE completion is discriminated so that, if the flag "CCD Completion" has been set up, the program flow can immediately proceeds to the AF data processing routine DFA. If the flag "CCD Completion" has not been set up at step #17, a switch discriminating subroutine at step #20 and an end discriminating subroutine at step #21 are successively executed, and conditions corresponding to the results of these discrimination are resumed.

Figure 9:
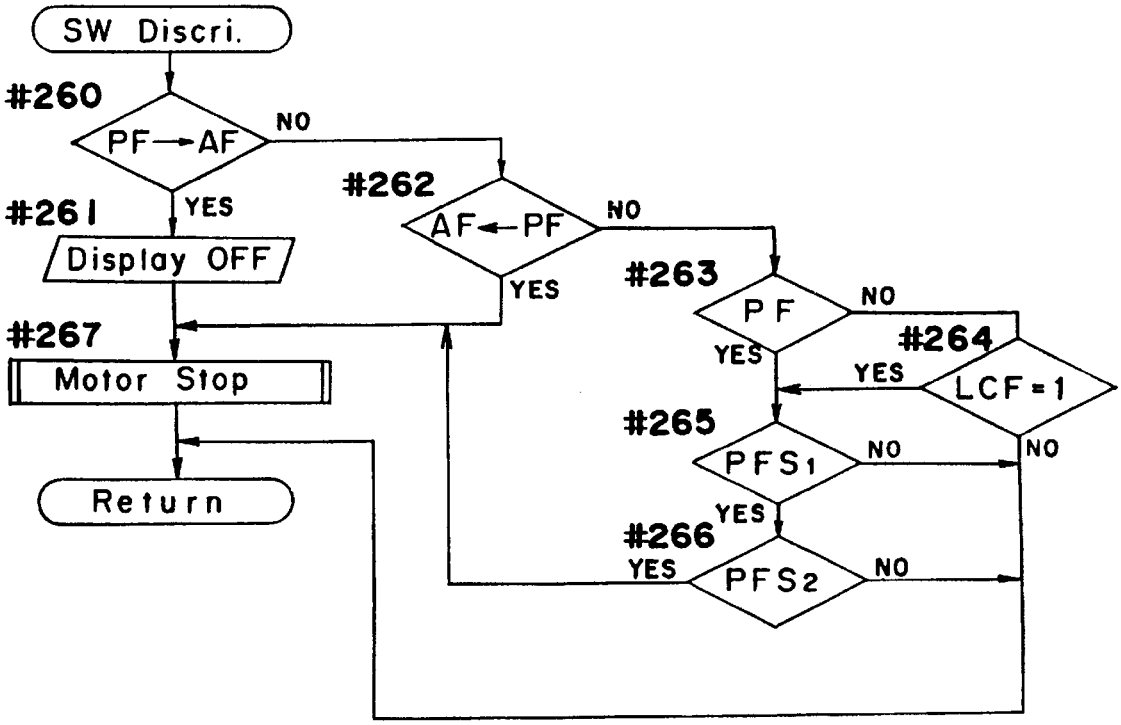
Figure 10:
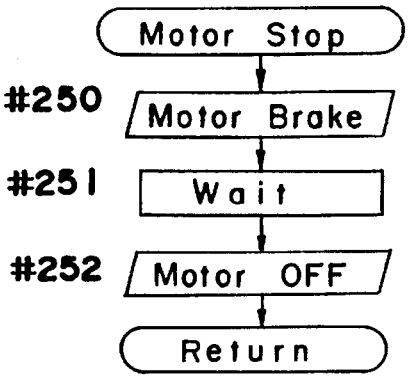

The switch discriminating subroutine at step #20 is illustrated in FIG. 9. This subroutine is for the purpose of determining an operating condition by discriminating the condition or change of any one of the mode selector switch AFS and the PF switches PFS1 and PFS2. The switch discriminating subroutine is provided at various places in the program flow of the illustrated embodiment together with the end discriminating subroutine. At the outset, at step #260, a decision is made to determine if the PF mode is switched over to the AF mode. If it has been switched, the display unit FDS (FIG. 1) is turned off so that under the PF mode, display of both the direction of defocus detected and the in-focus condition is effected at all times, while only the in-focus display segment c is turned on under the AF mode when in the in-focus condition. Then at step #267, a motor stop subroutine is executed to stop the motor MO, followed by the return to the main flow so that the drive of the motor MO can be re-started by operation under the AE mode. The motor stop subroutine is shown in FIG. 10 and is such that a motor brake is activated at step #250 and, after the passage at step #251 of a time required for the motor MO to be brought to a complete halt, the motor MO is turned off at step #252.

Should the result of decision at step #260 in FIG. 9 have indicated that the mode has not been switched over to the AF mode, a decision is made at step #262 to determine if the AF mode has been switched over to the PF mode, and if it has been switched, the motor stopping subroutine at step #267 is executed to stop the motor MO, followed by the return to the main flow so that the drive of the motor MO can be re-started by operation under the PF mode. If it has not been switched, the step #262 is followed by step #263 at which a decision is made to determine if the mode has been the PF mode.

If the camera is in the PF mode, and if both of the PF switches PFS1 and PFS2 are found opened at respective steps #265 and #266 indicating that no command is made to effect the lens shifting, the motor stop subroutine at step #267 is executed to stop the motor MO, followed by the return to the main flow. Should any one of the PF switches PFS1 and PFS2 be closed, the motor MO need not be stopped and, therefore, the program flow returns direct to the main flow.

Should the result of decision at step #263 have indicated the AF mode, a decision is made at step #264 to determine if a flag LCF indicative of a low contrast is "1". If it is "1", it means that the AF operation lacks a reliability because of the low contrast. Whether or not it is set under the PF mode, in which focusing is possible at the will of a photographer, is reconfirmed through steps #265 and #266 and, if none of the PF switches PFS1 and PFS2 is closed, the motor MO is stopped at step #267, followed by the return to the main flow. In the event that any one of the PF switches PFS1 and PFS2 has been closed, and if the low contrast flag LCF is not "1", the program flow returns to the main flow while the controlled condition of the motor MO is maintained as it is.

Figure 11:
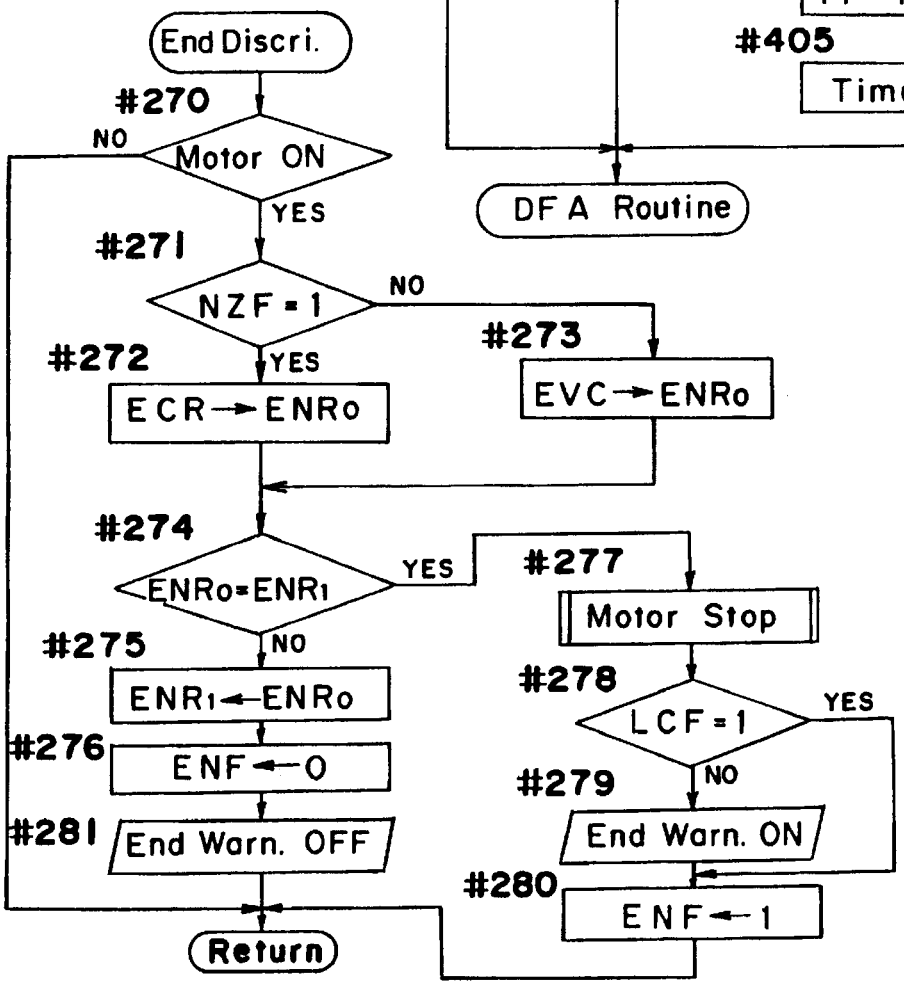

The end discriminating subroutine of step #21 in FIG. 2 is shown in FIG. 11 and is used to determine whether the lens is brought to a termination at the infinity position, at the closest available position during the lens shifting, or whether the lens is forcibly stopped. The motor MO is brought to a halt once one of the foregoing conditions has been detected. To this end, a decision is made at step #270 to determine if the motor MO is turned on, and if it is not, no process is needed allowing the program flow to return to the main flow. Should the motor MO be turned on, a subsequent decision is made at step #271 to determine if a near zone flag NZF is "1". This flag is set up when the lens is driven at low speed and will be "1" when the lens is at a near zone close to the in-focus position and the speed of movement has been switched over to a low speed. The near zone flag is also set when the lens has approached the in-focus position while under the PF mode where the lens is driven at low speed so that the lens can be accurately and naturally brought to a halt at the in-focus position.

If the flag NZF is "1", the program flow proceeds to step #272, but if it is not, the program flow proceeds to step #273. At step #272, the contents of a register ECR, adapted to monitor the lens shifting amount in the near zone, are set in a register ENRo. At step #273 the contents of the event counter EVC, adapted to monitor the lens shifting amount at the time the lens is shifted at a predetermined high speed, is set in the register ENRo. This shifting amount ENRo is, at subsequent step #274, compared with the shifting amount ENR1 set in a register ECR or the event counter EVC during the previous decision.

This subroutine is repeated at a predetermined cycle, and if ENRo=ENR1, it means that the lens is brought to a halt at the end with no change having occurred in the lens shifting amount since the previous decision. Therefore, the motor stop subroutine is executed at step #277 to stop the motor MO. At subsequent step #278, a decision is made to determine if the low contrast flag LCF is "1". If it is not "1", one of the display segments a and b of the display unit FDS which corresponds to the direction of shifting of the lens is energized to blink at step #279 thereby to provide an end warning display. Then, after an end flag ENF has been set up at step #280, the program flow returns to the main flow.

Where the result of decision at step #278 has indicated that the low contrast flag LCF is "1", both of the display segments a and b remain energized to blink, and after the flag ENF has been set to "1" at step #280, the program flow returns to the main flow.

Should the result of decision at step #274 have indicated ENRo≠ENR1, it means that the lens has been moved. Therefore, step #275 takes place at which the contents of the register ENRo in which data of the lens shifting amount at that time are transferred to the register ENR1. Thereafter, the end flag ENF is reset to "0" at step #276 and the end warning display is switched off at step #281, followed by the return to the main flow. The end flag ENF is reset and the end warning display is switched off resolution of the end condition caused by the fact that either the motor is reversed during the end condition or by the fact that a lens halted condition is removed.

Referring to FIG. 2, after the execution of the switch discriminating subroutine of FIG. 9 at step #20 and execution of the end discriminating routine of FIG. 11 at step #21, step #22 takes place. At step #22 a decision is made to determine if the shutter release switch S2 has been closed in order to ascertain whether or not the shutter release operation has gone through the second stage.

Where the shutter release switch S2 is opened, step #25 takes place at which a decision is made to determine if any one of the switched S1, PFS1 or PFS2 is closed, that is, if a photographing operational of the camera is continued. Should one of these switches S1, PFS1 or PFS2 be closed, the AE routine is resumed in view of the fact that the shutter release operation has not occurred, corresponding to the second stage in which the switch S2 is closed.

Where all of the switches S1, PFS1 and PFS2 is opened, this means that the photographing operation of the camera is released or interrupted. Therefore, a stop routine is resumed. After the initiation of the stop routine, at step #30, the power source GV is inactivated, followed by the inhibition of the A/D conversion in the light measuring circuit and A/D converter LAD at step #31. Then at step #32, all of the display elements are deenergized followed by the motor stop routine at step #33 to stop the motor MO. At subsequent step #34, interruption of any one of the terminal $\overline{\text{INT1}}$, the timer I and a counter are disabled. Interruption of the terminal $\overline{INT0}$ is enabled at step #35 so that the microcomputer MC can be brought to a low electric power consumption state while completing the control.

If the result of decision at step #22 has indicated that the shutter release switch S2 is closed, the program proceeds to step #23 at which a decision is made to determine if the shutter release is possible, that is, to determine if it is in the in-focus condition (Step #109 of FIG. 4) under AF mode, to determine if it is low contrast (Step #199 of FIG. 6), or to determine if it is under the PF mode (Step #140 of FIG. 5). If the shutter release is possible, a decision is made at step #24 to determine the state of the switch S4 which is adapted to be opened upon completion of the shutter charging. When the switch S4 is closed, the program proceeds to step #25 so that, depending on the operating conditions of the switches S1, PFS1 and PFS2, the return to the AE routine or to the initial condition can be subsequently accomplished.

When the switch S4 is open, the program flow proceeds to step #40 at which the motor stop subroutine is executed to bring the motor MO to a halt, followed by the deenergization of a display of focusing condition at step #41 in order to allow the photographing operation to be accomplished under AE control at step #42. Then, during a period from the time of completion of an exposure control operation and until the switch S4 is closed, step #43 is repeated until the switch S4 is closed, Step #44 then takes place at which a wait condition is established until the optical system of the camera is ready to enable the light measurement and the focus detection. The shutter release is then disabled at step #45, a flag "AE Incompletion" indicating the incompletion of the AE operation is set up at step #46, and the accumulating routine is executed at step #47 to effect the charge accumulation of the line sensor LM in readiness for the next succeeding focus detection.

This is for the purpose of enabling continuous shooting by allowing for automatic preparation for a subsequent photographing operation subsequent to each preceding photographing is automatically made.

Hereinafter, a main routine beginning from the start of the interruption process of the timer I or the terminal $\overline{INT0}$ and ending at one of the PF and AF routines after the execution of the AF data processing routine DFA will be described with particular reference to FIG. 3.

When the interruption of the timer I is effected, a decision is made at step #49 to determine if it is the interruption effected by the timer I during the accumulating operation. If it is in the accumulating operation, it means that the maximum accumulating time To has passed (Steps #240 to #242 to FIG. 8), and therefore, at step #50 the accumulation is forcibly halted, followed by step #54.

It is to be noted that the time I is utilized not only for controlling the maximum accumulating time, but also for counting the time which will pass from the start of the motor and until the motor attains the predetermined high speed condition and the time which will pass from the start of calculation of the focus detection and until the start of the accumulation.

Where the interruption of the terminal $\overline{INT1}$ is effected, it means that the accumulation has been completed within the maximum accumulating time To and, therefore, step #54 takes place.

At step #54, a time component corresponding to the count made by the timer I during a period between the start of accumulation and the end of the accumulation time To, and the time so subtracted is set in a register to as an accumulating time.

This remaining accumulation time is used for the purpose of determining a wait time, obtained by subtracting the remaining accumulating time to from the data processing time required to carry out the AF processing. The wait time is the amount of time to be elapsed between the start of the data processing and the timing at which the next charge accumulation is to be started, so that the charge accumulation for the next succeeding data processing which is to parallel the data processing can be completed at a predetermined timing slightly delayed relative to the time at which the present data processing is completed.

The setting of the timing for the start of the accumulating operation is necessitated by the following factors. If the charge accumulation is started simultaneously with the AF operation of the microcomputer MC, the timing of completion of the charge accumulation deviates considerably from the timing at which the microcomputer Mc is brought in a condition ready to perform a data dumping. If the data dumping is delayed until the accumulation is completed, no accurate data dumping can be carried out because of leakage of current and other reasons. Moreover, if the accumulation is effected each time an accumulation completion signal is inputted, a problem will arise where a large number of interruptions are effected as a result of the completion of each accumulation in a short time at a high brightness. Therefore, the time required to effect a data processing operation for the AF tends to be prolonged because of unnecessarily repeating the process accumulation.

In view of the above, it is assumed that the brightness will not change much, and that the time required for the AF data processing operation will not change much regardless of the selected mode such that a data T1 to can be obtained by subtracting the remaining accumulating time to from the time T1 and storing the result in time I. The AF data processing operation is counted by the time I (Step #70 of FIG. 3) at the time of start of the AF data processing operation so that, upon the completion of this counting, the next accumulation can be started. This is such that step #51 is executed because it is not during the accumulating operation when the interruption is effected by the timer I, and the accumulating operation is started during the execution of the subroutine of step #53 because it is during the AF operation, after which the routine for the AF operation is resumed.

In this way, unless the brightness of the target object to be photographed changes abruptly, the completion of the AF data processing operation is immediately followed by the completion of the accumulation and, therefore, data can be taken in with no waste of time and with no error resulting from the leakage of current.

After the setting of the accumulating time for the timing of start of the accumulating operation, a decision is made at step #55 to determine if it is the interruption of the terminal INT1 applied during the AF operation. This is for the purpose of determining whether or not the brigtness of the target object has abruptly changed. If the accumulation is completed much earlier than a predetermined timing and before the completion of the AF data processing operation then despite the fact that the accumulation has been started at said timing determined on the basis of the previous accumulating time, the brightness of the target object becomes much brighter than that during the previous accumulation and such data cannot be used for the subsequent AF data processing operation. Thus, it is deemed that the brightness has abruptly changed during the AF operation, and the program returns after the accumulation has been re-started during the execution of the accumulating routine at step #53, thereby enabling the photographing operation in AF mode to once again be performed with no difficulty even though the brightness has abruptly changed. If the terminal INT1 is not applied during the AF data processing operation at step #55, it is deemed that no abrupt change has occurred in brightness and the program flow proceeds to step #56.

At step #56, a decision is made to determine if the motor MO is in the predetermined high speed condition HS. If it is in the predetermined high speed condition, the contents of the event counter EVC then monitoring the lens shifting amount at the time are set in a register $\pi 1$ as data representative of the timing of completion of the accumulation paralleling the AF operation. And, after the data set in the register $\pi 1$ is useable in correcting the amount of movement of the lens during the accumulating operation as well as that set in the register $\pi 0$ at step #244 of FIG. 8, the program proceeds to step #58. On the other hand, if the motor MO is not in the predetermined high speed condition, the accumulation is taking place while the lens is held still. Therefore a correction for lens movement need not be effected and the program proceeds directly to step #58. At step #58, the data from the line sensor LM is dumped.

After the data dumping, step #300 takes place at which a decision is made to determine if a flag SCF is "1". This flag SCF is set to "1" when the AF processing routine is executed, for the purpose of the calculation for the focus detection, subsequent to the completion of the first dumping of the accumulation data and before the start of the time counting for the next accumulation (Step #70 of FIG. 3). It is therefore is possible to determine if the first data dumping and the subsequent AF data processing operation have been performed by checking the flag SCF. The flag SCF is set to "1" when, as a result of the AF routine of FIG. 4 being executed upon the completion of the data dumping attributable to the first accumulation and also upon the completion of the AF data processing operation based thereon. The program proceeds to step #138 and the motor MO is retained activated until the interruption of the terminal $\overline{\text{INT1}}$ or the timer I attributable to the second accumulation.

In connection with this process, when the result of decision at step #300 indicates that the flag SCF is "1", this means the completion of the second accumulation and, therefore, the motor M is turned on at step #302. Thereafter, and after a time T2 required for the motor MO to be brought in the predetermined high speed condition has been set in the timer I at step #303, the interruption of the timer I is enabled at step #304 so that the accumulating operation at step #53 can be initiated after the motor MO has been brought to the predetermined high speed condition.

At step #305 and #306, the difference N-Nn between the defocus amount N obtained at step #90 on the basis of the first accumulation and the near zone width Nn, that is, the amount of shifting of the lens required for shifting the lens into the near zone, is successively set in the event counter EVC and the register $\pi 1$.

Thereafter, at step #301, the interruption of the event counter EVC is enabled, followed by step #59.

Thus, arrangement has been made so that during the AF data processing operation subsequent to the completion of the first accumulation, the start of the motor MO can be withheld until the completion of the second accumulation. Upon the completion of the second accumulation, the motor MO can be started and the calculation for the second focus detection can be performed. This is because, if the accumulation is effected at the time of start of the motor MO, no correction of the amount of movement can be accomplished. Also, although a relatively long time is required for the motor to be brought the predetermined high speed condition subsequent to the start thereof, no waste of time will occur because this time can also be used for the second focus detection calculation. Moreover, if the target object undergoes a movement or any other motion, it is preferable to shift the lens on the basis of data as updated as possible because the lens can be brought to the in-focus position at high speed.

The contents of the event counter EVC can be subtracted in response to pulses input from the encoder EC through the terminal CKIN and in accordance with the drive of the motor MO. When the contents of the event counter EVC become "0", the lens is deemed to have arrived in the near zone accompanied by the interruption of the event counter EVC so that the interruption of the event counter EV in FIG. 7 can enter a processing flow.

Referring back to FIG. 3, the time T2 necessary for the motor MO to be brought to the high speed condition from start of driving the motor MO is set in the timer I at step #303. Thereafter, when the interruption of the timer I occurs after the timer I interruption has been rendered possible at step #304, it means that the focus detecting operation for the AF has been completed and the AE routine is repeated. However, in the case of the timer interruption processing flow, it means neither the accumulating operation nor the AF operation and, accordingly, a flag "HS" indicative of the predetermined high speed condition is set at step #52 and the accumulation is started at step #53, followed by the return to a return address in the AF routine thereby to provide the basis for the determination of the motor MO being in the predetermined high speed condition. *The means for driving the motor 40 is a drive circuit MD which will drive the motor MO until it reaches a predetermined speed condition. The determining means for providing a determination when the motor reaches a predetermined speed condition is a timer I set to a time $T_2$ at step #303.*

On the other hand, if the result of decision at step #300 indicates that the flag SCF is "0", the above described process need not be performed and the program proceeds to step #59.

Depending on whether or not the flag "AE Completion" has been set up at step #59, the program returns after the flag "CCD completion" has been set up as hereinbefore described, or the AF data processing routine DFA is executed.

Where the AF data processing routine DFA is executed, a decision is made at step #60 to determine if it is under the PF mode, and if under the PF mode, the program returns via step #61, but if not under the PF mode, the program proceeds to step #610 to determine if the low contrast flag LCF is "1".

This flag LCF indicates low contrast. If the contrast of light information entering the line sensor LM from the target object is low, the focus detection is difficult or impossible to perform and its function cannot be reliable. The flag LCF will be "1" when at low contrast and "0" when it is not. The flag "CCD Completion" is set to "1" at step #61 either when the PF mode is discriminated to be set at step #60 or when the low contrast flag LCF is discriminated to be set up at step #610. The AE routine is executed thereafter. This step #61 is provided for avoiding undesirable operation that the microprocessor MC executes only the AF data processing routine without executing the AE routine after the latter has been once performed first.

When the flag LCF is determined at step #610 to be "1", the return takes place via step #610, but when it is determined to be "0", the AF data processing routine DFA is executed.

During the execution of this routine, the resetting of the flag "CCD Completion" takes place at step #65 if it has been set up, followed by a decision at step #66 to determine if the flag FDF is "0". This flag FDF is adapted to be "0" when this routine is executed for the first time, but to be "1" when it is not (Step #69), and when it is "0", the program flow proceeds to step #307. At step #307, the first accumulation and the data dumping have been completed and it is in position before the calculation of the focus detection during the execution of the AF data processing routine DFA is carried out, and therefore, a flag SCF indicative thereof is set to "1". At subsequent step #69, the flag FDF is set to "1". Subsequently at step #70, data representative of a time required to pass before the start of accumulation of T1-to is set in the time I, the interruption of the timer I is enabled at step #71, and at step #72 a shift amount calculation is performed thereby to resume the AF data processing operation.

While the details of step #72 during which the shift amount is calculated; step #79 during which the reliability of the focus detection due to the low contrast is determined, step #80 during which the interpolation is effected; and step #81 during which the conversion is made into a defocus amount are disclosed in U.S. Pat. No. 4,636,624 and some other publications and, therefore, are not herein discussed, the shift amount calculation is such that the shift amount of an image relative to the other image is calculated for the purpose of detecting the interval between two images formed by separator lenses on a light receiving surface of the line sensor LM. The Interpolation is carried out in such a way as to finely interpolate the shift amount, obtained by the above shift amount calculation, thereby to detect the interval between the two images. The conversion into the defocus amount is for the purpose of converting the amount of deviation from the image interval in an in-focus condition of the image interval, that is obtained by the interpolation, i.e., the amount of deviation from the in-focus condition in a direction perpendicular to the optical axis, into a amount of deviation from the in-focus condition in a direction parallel to the optical axis.

Where the passage through step #66 is not for the first time and, therefore, the flag FDF is "1", the program flow proceeds to step #67 at which a decision is made to determine if the motor MO is in the predetermined high speed condition. If it is not in the high speed condition, a decision is made at step #68 to determine if the low contrast flag LCF is "1". Where the result of decision at step #67 indicates that the motor MO is in the high speed condition, and where the result of decision at step #68 indicates that the flag LCF is "1", in order for the accumulation for the subsequent data processing to parallel the AF data processing which continues, the program flow proceeds to step #70 at which the timer I is set and then to step #71 at which the interruption of the timer I is enabled, followed by the shift calculation at step #72.

On the other hand, where step #68 is resumed as a result of decision at step #67 indicating that the motor MO is not in the predetermined high speed condition, and where the result of decision at step #68 indicates that the low contrast flag LCF is not "1", the program flow proceeds to step #72. This is because no accumulating operation of the line sensor LM is carried out if the motor is not in the predetermined high speed condition, but the reliability exists, and therefore, steps #70 and #71 are not executed.

Subsequent to the shift calculation at step #72, an operation similar to the program flow from step #20 to step #25 of the main routine of FIG. 2 takes place during a program flow from step #73 to step #78. Only when one of the switches S1, PFS1 and PfS2 is closed at step #78, that is, only when it is confirmed that the photographing operation is to be carried out, the program flow subsequent to the low contrast determination at step #79 is executed.

Figure 6:
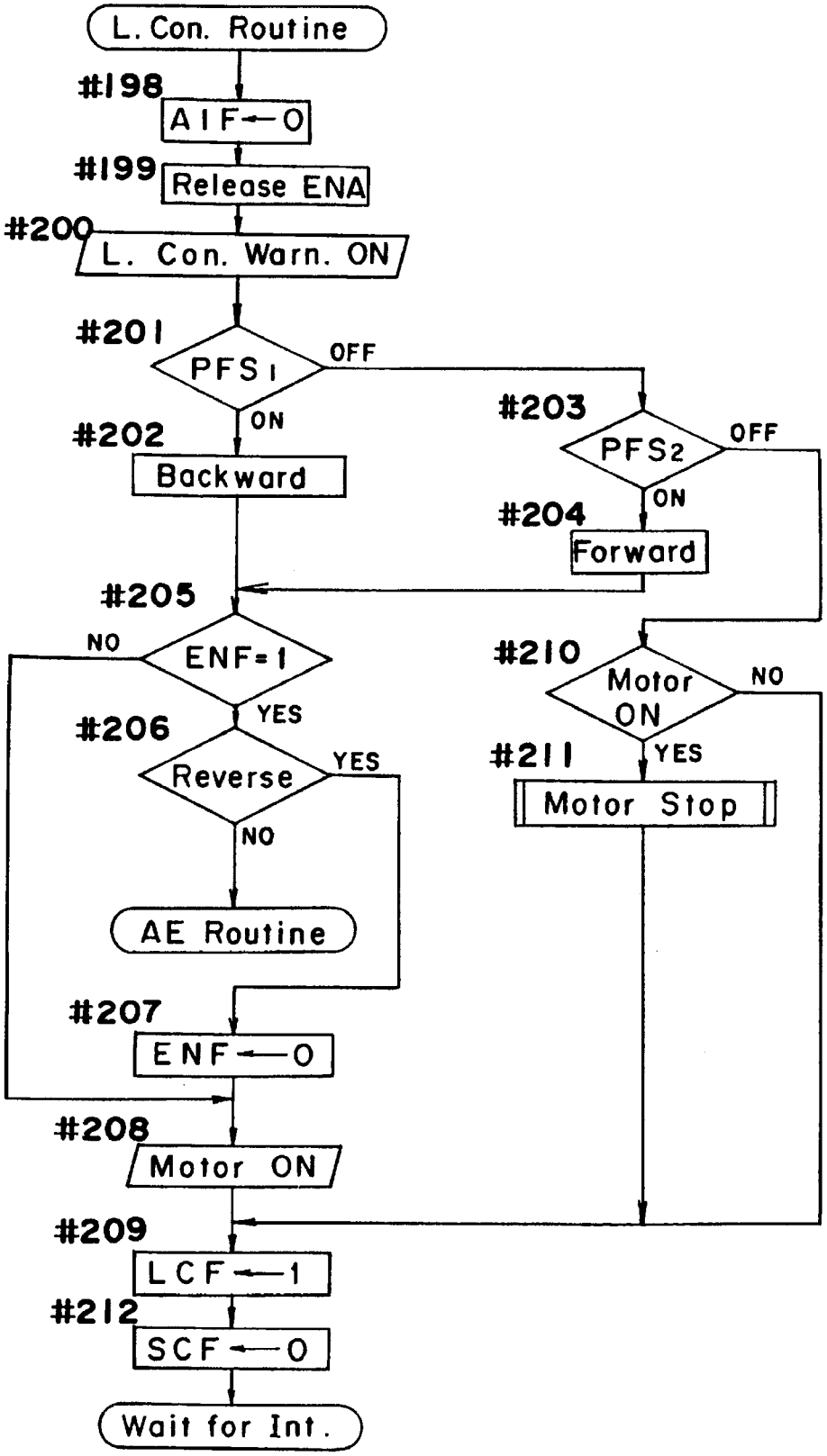

While only when the result of decision at step #79 has not indicated the low contrast the program flow proceeds to the interpolation at step #80 and then to the defocus conversion at step #81, when it has indicate the low contrast, a low contrast routine shown in FIG. 6 is executed so that, only when one of the PF switches PFS1 and PFS2 is closed, the continuation of the photographing operation is possible while the lens is shifted by the motor MO. When none of the switches PFS1 and PFS2 are closed, the motor is stopped to interrupt the motor drive of the lens.

Referring to FIG. 6, the low contrast routine shown therein will be described. At step #198, an in-focus flag AIF is rendered to be "0", and then at step #199, the shutter release is enabled while establishing a shutter release priority condition. At step #200, a low contrast warning is activated. That is, both of the display segments a and b shown in FIG. 1 are energized to blink. Thereafter, at step #201, a decision is made to determine if the PF switch PFS1 is closed. If it is closed, the lens shifting direction is fixed at step #202 to a backward direction, but if it is not closed, a decision is made at step #203 to determine if the PF switch PfS2 is closed. If it is closed, the lens shifting direction is fixed at step #204 to a forward direction, but if it is not closed, it means that the PF mode is not continued and, therefore, no motor drive is needed. In such case, a decision is made at step #210 to determine if the motor MO is activated and, if it is not activated, it remains as it is, but if it is activated, the motor stop routine is executed at step #211 to stop the motor MO, followed by step #209. At step #209, the low contrast flag LCF is set up, and, after the flag SCF has been rendered to be "0" at step #212 in such a way as to execute the initial accumulation of the line sensor LM, either the interruption of the terminal $\overline{\text{INT1}}$ or the interruption of the timer I resulting from the re-accumulation of the line sensor LM is waited for, a normal operation from the flowchart of FIG. 3 being subsequently resumed when the interruption is effected.

Subsequent to step #202 or step #204, a decision is made at step #205 to determine if an end flag ENF "1" is set up, and, if it is not "1", the motor MO is activated at step #208 to effect the motor drive of the lens under the PF mode, followed in succession by step #209 and step #212 to continue the focus detecting operation.

If at step #205 the end flag ENF "1" has been set up, a decision is made at step #206 to determine if the driving direction of the motor MO has been reversed relative to that at the time of end detection. If it has not been reversed, the AE routine is resumed, but if it has been reversed, the end flag ENF is reset to "0" at step #207. Subsequent to step #207, the program flow of step #208 et seq. takes place, as is the case where the result of decision at step #205 has indicated the end flag ENF has been set up, to continue the motor drive of the lens and the focus detecting operation.

Accordingly, when the low contrast condition is discriminated, regardless of whether the mode is the AF mode or whether it is the PF mode, the driving direction is determined depending on the respective states of the PF switches PFS1 and PFS2, so that the focus detection can be repeated while the lens is shifted.

Referring to FIG. 3, where the result of decision at step #79 does not indicate the low contrast, the interpolation at step #80 and the defocus conversion at step #81 are sequentially performed, followed by step #82 at which a decision is made to determine if the low contrast flag LCF is rendered to be "1" as a result of the previous low contrast determination. If the low contrast flag LCF was not rendered to be "1" it means that reliable AF information is available end, therefore, at step #90, the lens drive amount is calculated. (The details thereof are disclosed in U.S. Pat. No. 4,509,842).

Should the flag LCF as determined at step #82 be rendered to be "1", it is returned to "0" at step #83, followed by a decision at step #84 to determine whether or not it is the AF mode. In the case of the AF mode, the shutter release is disabled at step #85. Subsequent to step #85, or in the case where the result of decision at step #84 does not indicate the AF mode, step #86 takes place at which a warning display of the low contrast is turned off. Thereafter, a decision is made at step #87 to determine if the motor MO is activated. If the motor MO is not activated, the drive amount calculation is carried out at step #90, but if it is activated, the motor stop subroutine shows in FIG. 10 is executed at step #88 to stop the motor MO and, then, after the accumulating routine shown in FIG. 8 has been executed at step #89, the program flow returns to the AE routine.

At step #90, the lens drive amount No is calculated on the basis of the defocus amount obtained at step #81. then, at step #91, a decision is made to determine if the motor is in the predetermined high speed condition. If the motor is in the predetermined high speed condition, the contents of the event counter EVC is transferred at step #92 to a register $\pi 2$ as lens position information at the time of completion of the AF operation, and subsequently, at step #93, a correcting calculation is carried in the following manner.

$$N=NO-[\tfrac{1}{2}(\pi 0-\pi)+(\pi 1-\pi 2)]$$

This is disclosed in detail in U.S. Pat. No. 4,509,842 and, therefore, will not be herein discussed. However, the correcting calculation is for the purpose of carrying out a correction wherein the amount of movement of the lens within the range in which no drive amount can be calculated, that is, the amount 90 $0-\pi 1$ of movement during the initial accumulating operation, and the amount $\pi 1-\pi 2$ of movement during the AF processing operation are subtracted from the lens drive amount No obtained at step #90, and, in the case of the initial accumulating operation taking place, the half of the difference $\pi 0-\pi 1$, that is, an intermediate point thereof, is taken as the lens position.

After the correcting calculation at step #93, a decision is made at step #94 to determine if it is under the Pf mode, and if not under the PF mode, it means the AF mode is taking place, and, therefore, the AF routine of FIG. 4 is executed. If under the PF mode, the PF routine of FIG. 5 is executed.

On the other hand, if the result of the decision at step #91 does not indicate the predetermined high speed condition, step #308 takes place to determine if the flag SCF is "1", and if it is not "1", the program flow proceeds to step #94. However, if it is "1", another decision is made at step #330 to determine if the motor is activated and the lens is therefore being shifted. Should the motor not be activated, it means that a result of the first focus detection has been completed and, therefore, the program flow proceeds to step #94. On the other hand, if the motor is activated, it means that a result of the second focus detection has been completed and, therefore, after the flag SCF has been returned to "0" at step #309, the contents of the event counter EVC then monitoring the lens shifting amount is transferred at step #310 to the register $\pi 2$ as the lens position information at the time of completion of the AF processing operation. Therefore, at step #311, No-($\pi 1-\pi 2$) is calculated to correct the lens shifting amount during the AF data processing operation, after which step #94 takes place. This is because the lens shifting is inhibited (if SCF=1 at step #138 of FIG. 4) even during the second accumulating operation and, upon the completion of the second accumulating operation, the motor is started (step #302 of FIG. 3) to shift the lens while the calculation for the focus detection is taking place.

The AF routine shown in FIG. 4 will now be described. At step #100, a decision is made to determine if the above mentioned lens shifting amount N is equal to or smaller than the in-focus region width N1, that is, if the lens position is within the in-focus region, and if it is within the in-focus region, a decision is made at step #101 to determine if the motor MO is activated. Should the motor MO be activated, the motor stop subroutine is executed at step #102 to stop the motor MO, followed by the return to the AE routine via the accumulating routine which has been executed at step #103 for the in-focus condition reconfirmation.

The in-focus condition reconfirmation is carried out for the purpose of reconfirming whether or not the in-focus condition could have been established while the lens shifting is interrupted, because the detection of the in-focus condition while the motor MO is activated is possible only when at the low contrast and where in the predetermined high speed condition (the focus detection is not performed in low speed condition of the motor MO). therefore, there is a great possibility that the brightness of the target object may abruptly change and/or an erroneous measurement may occur.

When the result of decision at step #101 indicates that the motor MO has been brought to a halt, there will not arise such a problem as hereinabove described and, therefore, the in-focus condition is determined by the fact that the motor MO has been brought to a halt, allowing an in-focus processing operation to be executed at step #105 et seq.

At step #105, a decision is made to determine if the flag ENF is "1", and if it is "1", it means that, even though the lens has arrived at the end, the in-focus condition is established and, therefore, after an end warning display has been turned off at step #106, the end flag ENF is reset to "0" at step #107. On the other hand, if the end flag ENF as determined at step #105 is "0", or subsequent to step #107, the program flow proceeds to step #108 to effect the in-focus display and, after the shutter release has been enabled at step #109, the in-focus flag AIF for the AE lock, to be effected at the in-focus condition as hereinabove described, is rendered to be "1".

At subsequent step #312, the flag SCF is returned to "0", and the interruption of each of the timer I and the terminal $\overline{INT1}$ is then disabled. Thereafter, after the focus locked condition wherein the accumulating and AF processing operations are no longer executed has been established, the program flow returns to the AE routine to enable the photographing operation.

When the program flow returns to the AE routine, and after it has been confirmed at step #12 that the flag AIF is "1", the AE calculation at step #14 is performed without the inputting of the measured light value being performed at step #13, thereby to accomplish the AE lock with no new measured light input received. In other words, a one-shot AF system is employed so that focus locked and AE locked conditions can be established during the in-focus condition.

Reverting to the initial step #100 of the AF routine, if the lens shifting amount N is greater than the in-focus region width Ni, it means that no in-focus condition is established and, therefore, the lens need not be shifted. Therefore, in such case, a DRV routine for shifting the lens is executed. During the execution of DRV routine, and at step #115, a decision is made to determine if the end flag ENF is "1". When the flag ENF is "1", another decision is made at step #116 to determine if the lens shifting direction is reversed, and if it is not reversed, the accumulating routine at step #117 is followed by the AE routine to continue both of the AE and AF operations.

On the other hand, if the lens shifting direction is reversed, the display of the end warning is turned off at step #118, followed by step #119 at which the end flag ENF if returned to "0", after which does step #120 take place. If the result of decision at step #115 indicates that the flag ENF is "0", the program flow immediately proceeds to step #120.

At step #120, a decision is made to determine if the lens is in the front focus condition. If it is in the front focus condition, it is determined that the lens should be shifted in the backward direction at step #121, but if it is not in the front focus condition indicating that the lens is in the rear focus condition, it is determined that the lens should be shifted in the forward direction at step #122. Subsequent to either step #121 or step #122, the lens is shifted upon the activation of the motor MO so as to approach the in-focus position.

At step #123, a decision is made to determine if the lens shifting amount N is equal to or smaller than the near zone width Nn, that is, if the lens is within the near zone width Nn. If the lens is within the near zone width Nn, step #124 takes place to determine if the motor MO is activated, and if the motor MO is activated, the motor brake is actuated at step #125 to bring it into a predetermined low speed condition. On the other hand, if the motor MO is not activated, the motor MO is activated at step #126 to shift the lens towards the in-focus position, followed by steps #127 and 128. The lens shifting amount N towards the in-focus position is set in a register ECR at step #127, and the event counter EVC is set to "1" at step #128, so that it can be used for controlling the motor MO to the low speed condition while the event counter EVC is "1". *The means, operating when a movement amount of the photography line towards its in-focus position is larger than a predetermined value, for controlling the microprocessor MC and the motor MO includes the decisional step #123.*

Subsequently, at step #129, the resetting of and the start of the timer II are carried out at step #130, the interruption of the event counter EVC is enabled so that when the lens is shifted by an amount corresponding to one pulse generated from the encoder EC, the interruption of the event counter EVC can be effected to initiate the event counter interrupting process flow shown in FIG. 7. At subsequent step #131, the near zone flag NZF is rendered to be "1". Then, at step #314, the flag SCF is returned to "1", and at step 315, the interruption of the timer I and the terminal $\overline{\text{INT1}}$ is disabled, followed by the execution of the AE routine. This is for the purpose of inhibiting both of the accumulation and the AF calculating operation from taking place because, before the in-focus is established, the lens is not shifted at a constant speed.

If the result of the decision at step #123 indicates that the lens shifting amount N is greater than the near zone width Nn, the program flow proceeds to step #132 at which the near zone flag NZF is rendered to be "0", followed by a decision at step #133 to determine if the motor MO is activated. If the motor MO is not activated, as determined at step #133, it may be considered the AF operation based on the initial accumulation and, therefore, step #138 takes place to determine if the flag SCF is "1". If the flag SCF is "1", it means the AF operation is taking place based on the initial accumulation and, therefore, a wait condition is established to wait for the interruption of the time I or the terminal $\overline{\text{INT1}}$ until the second accumulation so designed as to terminate a little beyond the timing of completion of the AF operation paralleling therewith terminates. *Thus, a first mode of operation is selected wherein exposure and focus control calculations can be performed in the microprocessor MC.*

When the interruption is effected, the program flow from step #300 to step #301, shown in FIG. 3, is executed to activate the motor, after the setting of the second accumulating time in the register to and the date dumping have been performed according to the flow of FIG. 3.

Where the flag SCF, as determined at step #138, is not "1", it means that the AF operation based on the second accumulating operation has been terminated. In order for the lens to be shifted at this stage on the basis of the AF processing data, the motor MO is activated at step #134 in view of the fact that the flag SCF has been rendered to be "0" at step #138. Then, at step #135, the time T2 required for the motor MO to be brought in the predetermined high speed condition is set in the timer I, and at subsequent step #136, the interruption of the timer I is enabled so that, when the motor MO is brought in the predetermined high speed condition, the next succeeding accumulation can be initiated upon the interruption of the timer I. Thereafter, the shifting amount N-Nn towards the near zone is set in the event counter EVC so that, by the effect of a pulse input from the encoder EC to a terminal CKIN in accordance with the drive of the motor MO, the value set therein can be substrated. At step #139, the interruption of the event counter is enabled to execute the AE routine. *Thus, a second mode of operation is selected wherein only an exposure control calculation is performed in the microprocessor MC.*

Figure 7:
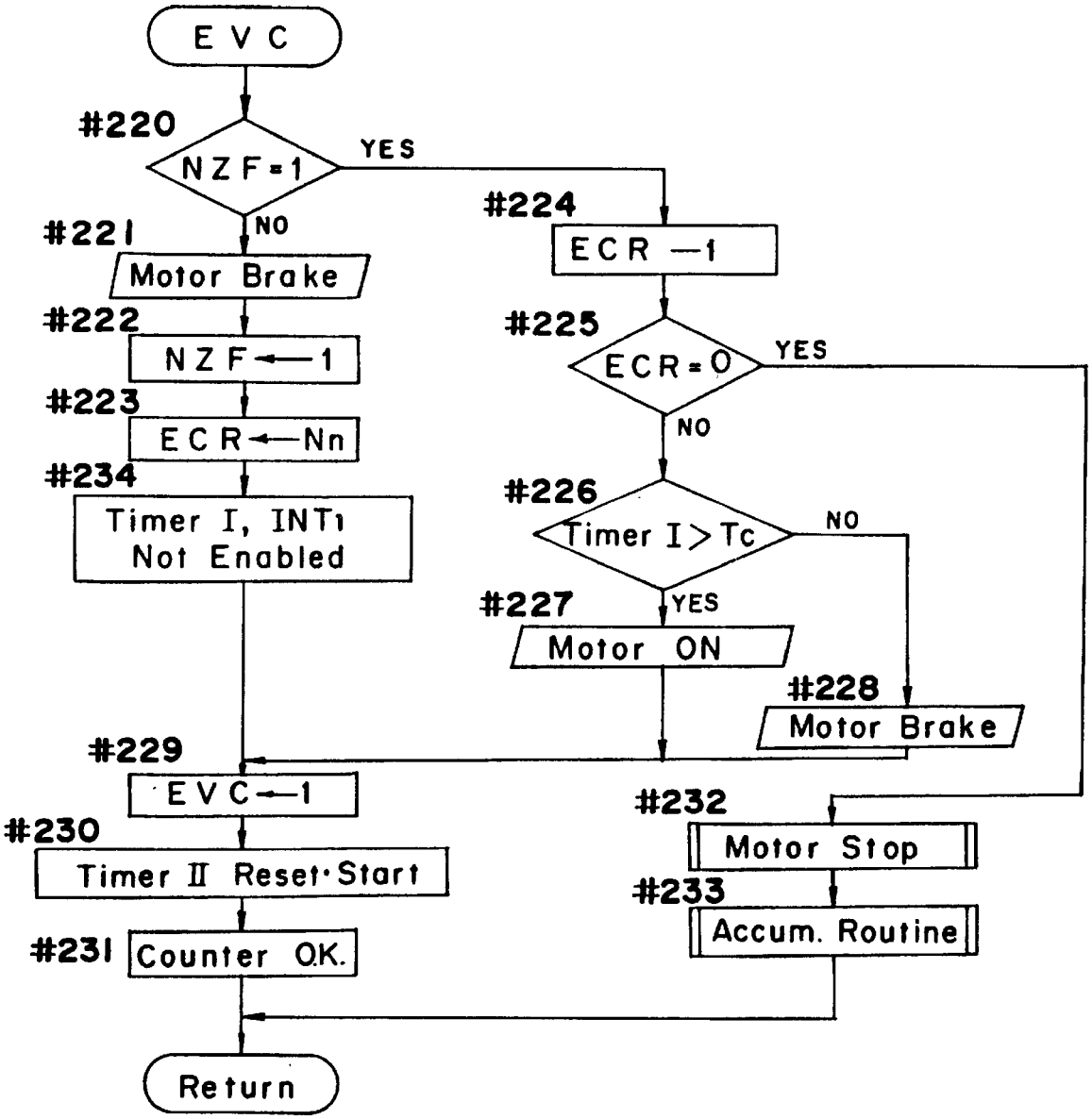

The interruption of the event counter EVC is effected, when the contents of the event counter EVC are reduced to "0" by said subtraction, as a result of the arrival of lens in the near zone so that the event counter interruption process flow shown in FIG. 7 can be executed.

Should the motor MO as determined at step #133 be activated, the program flow proceeds to step #137 thereby to execute the AE routine.

With particular reference to FIG. 5, the PF routine will now be described. After the flag SCF and the flag AIF have been rendered to be "0" at step #145a, the shutter release is enabled at step #140. This is for the purpose of obtaining a so-called shutter release priority mode wherein during the PF mode the shutter release can be affected at any time at the will of the photographer, whereas during the AF mode a so-called AF priority mode is obtained wherein the shutter release is enabled only when the in-focus condition is established. Also, in view of the in-focus flag AIF having been rendered to be "0", no AE lock at step #12 take place even when in the in-focus condition, and the input of the measured light data at step #13 can be carried out at any time.

This is for the purpose that, in view of the shutter release priority mode, the lens may be shifted even after the in-focus condition has been established and the AE operation can be effected simultaneously with the AF operation in order to control the exposure on the basis of the updated measured light data.

When the program flow proceeds to step #141, a decision is made to determine if the lens shifting amount N is equal to or smaller than the in-focus region width Ni, that is, if the lends is within the in-focus region. If it is within the in-focus region, it is determined whether the motor MO is activated at step #142. If the motor MO is determined to be activated, step #143 takes place to execute the motor stop subroutine to stop the motor, followed by step #144 at which an in-focus number register IFR is reset to "0". Subsequently, and at step #147, a decision is made to determine if the end flag ENF is "1", and if it is "1", the end warning display is turned off at step #148 and the end flag ENF is rendered to be "0" at step #149. Subsequent to step #149, or when the result of decision at step #147 has indicated that the end flag ENF is "1", the program flow proceeds to step #150 at which the in-focus display is effected. Thereafter, the accumulating routine is executed at step #151 to effect the accumulation for the next succeeding detection, followed by the execution of the AE routine.

Where the motor MO as determined at step #142 is not activated, it may be thought that even through the motor MO is temporarily stopped as a result of the arrival at the in-focus position, the PF routine is executed with no shutter release taking place. Therefore, in order to determine whether or not the photographer intends the motor drive, it is necessary to determine whether one of the PF switches PFS1 and PFS2 is closed. For this purpose, the program flow proceeds to step #155 at which a decision is made to determine if the PF switch PFS1 is closed, and if it is opened, whether or not the PF switch PFS2 is closed is determined at step #157. Should both of the PF switches PFS1 and PFS2 be opened, it is all right to leave the motor MO stopped and the program flow proceeds to step #144 at which an operation similar to that subsequent to the motor stop routine at step #143 is performed.

If the PF switch PFS1 is closed, it is determined at step #156 that the lens should be shifted in the backward direction, but if the PF switch PFS2 is closed, it is determined at step #158 that the lens should be shifted in the forward direction. Thereafter, at step #145, the register IFR is incremented by 1, and a decision is made at step #146 to determine if the contents of the register IFR is 3, that is, to determine if, since the contents of the register IFR was 0 at the time of the first in-focus condition, confirmation of the in-focus condition has been done four time. If IFR≠3, the previously mentioned operation is repeated from step #147.

When the contents of the register IFR attains 3, the fact that one of the PF switches PFS1 and PFS2 is continuously depressed is acted upon despite the in-focus condition and, therefore, it means that the photographer is trying to purposely displace the in-focus position while effecting the lens shifting. For this lens shifting, the direction of defocus is displayed at step #159 and, after the near zone flag NZF has been rendered to be "1" for the low speed drive at step #160, the amount of movement Nc of the lens at a low speed is set in a register ECR at step #161, followed by the setting of "1" to the event counter EVC at step #162. At step #163, the resetting and the start of the timer II are effected, the interruption of the counter is enabled at step #164, and the motor MO is activated at step #165 to execute the AE routine.

In this way, the forced movement of the lens from the in-focus position resulting from the continued depression of one of the PF switches from the continued depression of one of the PF switches PFS1 and PFS2, even though the in-focus condition has been accomplished under the PF mode, is carried out after the in-focus condition has been confirmed four times, by executing the AE routine while the motor MO is driven by each predetermined amount Nc in a direction required to move the lens in a direction determined by such one of the PF switches PFS1 and PFS2.

It is to be noted that, instead of the motor MO being activated to drive the lens when the in-focus condition has been confirmed the predetermined number of times while one of the PF switches PFS1 and PFS2 is kept closed, it may instead be possible to employ a system wherein the motor MO can be activated upon the passage of a predetermined time while one of the PF switches PFS1 and PFS2 is kept closed. In this case, step #144 is to be the resetting and start of the timer II, step #145 is to be omitted, and step #146 is to be a decision to determine if the timer II is equal to or greater than Tk (constant, For example, 2 sec.)

Referring to step #141, if it is determined that no in-focus condition is accomplished, the in-focus flag AIF is reset to "0" at step #169, and at subsequent step #170, the direction of defocus is displayed. This is for the purpose of enabling the photographer to selectively depress one of the PF switches PFS1 and PFS2 according to the determination of the drive direction in which the photographers is to move the lens towards the in-focus position although under the AF mode no display other than the display of the in-focus condition is effected, the direction of defocus is displayed under the PF mode even during the motor drive being taken place.

After a decision has been made to determine which one of the PF switches PFS1 and PFS2 is closed, a decision is made at step #172 or #174 to determine if the shifting direction of the lens corresponding to which one of the PF switches PFS1 and PFS2 which has been closed conforms to the direction of defocus, and if they conform, the DRV routine shown in FIG. 4 for the lens shifting is executed.

Accordingly, in such case, the lens can be shifted at a high speed in a zone, other than the near zone as is the case during the execution of the AF routine, or at a low speed within the near zone, respectively, so that the lens can be brought to the in-focus position.

Where neither of the switches PFS1 and PFS2 is closed as indicated by the result of decision at step #171 and #173, the program flow proceeds to step #190 to determine if the motor MO is activated, and if it is activated, the motor stop routine is then executed to stop the motor MO.

Where the result of decision at step #190 indicates that the motor MO is not activated, step #192 takes places to determine if the end flag ENF is "1". If it is "1", the display of the end warning is turned off at step #193, and the end flag ENF is rendered to be "0" at step #194, allowing the subsequent accumulating routine to be executed. If the end flag ENF is not "1", the program flow process to step #195. After the accumulating routine at step #195, the AE routine is executed.

Where, as results of decision at steps #172 and #174, the direction of the lens shifting designated by the closure of one of the PF switches PFS1 and PFS2 does not conform to the direction of defocus, it is necessary to ascertain whether or not the reversal of the lens shifting direction has resulted from the arrival of the lens at the end. For this purpose, a decision is made at step #175 to determine if the end flag is "1". If it is "1", the next succeeding decision is made at step #176 to determine if both of the lens shifting direction at the time of detection of end, and the shifting direction designated by the closure of one of the PF switches PFS1 and PFS2, are reversed. If they are not reversed, the accumulating routine is executed at step #177, followed by the AE routine.

Should the result of decision at step #175 indicate that the end flag ENF is not "1", the near zone flag NZF is then rendered to be "1" at step #180, followed by the process similar to the previously described process from step #160 to step #165, before the program flow proceeds to the execution of the AE routine via step #185.

If the result of decision at step #176 indicates that both of the directions are reversed, step #178 at which the end warning display is turned off and step #179 at which the end flag ENF is rendered to be "0" take place in succession before the program flow process to step #180.

The interruption processing operation of the event counter will now be described with reference to FIG. 7. The interruption of this counter EVC is enabled at step #301 of FIG. 3, steps #130 and #139 of FIG. 4 steps #164 and #184 of FIG. 5, and at step #231 of FIG. 7. When the content of the event counter EVC is reduced to "0", the interruption is effected to execute the flow of FIG. 7. At the outset, at step #220, a decision is made to determine if the near zone flag NZF is "1". If it is "0", step #221 takes place, but if it is "1", step #224 takes place. This is for the purpose of differentiating between the interruption during a flow in which the near zone flag NZF is not set to "1", that is, the case wherein the lens is shifted at a high speed, and the interruption during a flow in which the near zone flag NZF is set to "1", that is, the case with the lens shifted at a low speed.

If the near zone flag NZF is "0", it means that the lens enters the near zone from exterior of the near zone and, therefore, the motor brake is effected at step 221, the near zone flag NZF is set to "1" at step #222, and the near zone width Nn is set in the register ECR at step #223. The interruption of timer I and that of terminal $\overline{\text{INT1}}$ are disabled at step #234 for interrupting the data dumping of subsequent accumulation within the near zone.

Subsequently, at step #229, the event counter EVC is set to "1" so that it can be utilized for the speed control. At step #230, the resetting and start of the timer II are performed, and at step #231 the interruption of the counter is enabled, followed by the return to the AF return address in the case of the AF operation or the AE return address in the case of the AE operation.

On the other hand, if the near zone flag NZF is "1", step #224 takes place at which 1 is subtracted from the contents of the register ECR, followed by a decision at step #225 to determine if the register ECR is "0".

If the near zone flag NZF is "0", indicative of the arrival at the in-focus position, the motor stop subroutine is executed at step #232 to bring the motor MO to a halt the accumulation for the confirmation of the in-focus condition is started at step #233, and the return to the return address is accomplished in a manner similar to that described above.

If the result of decision step #225 indicates that the register ECR is not "0", another decision is made at step #226 to determine if the count of the timer II is greater than a predetermined if the count of the timer II is greater than a predetermined drive amount Tc. If it is greater than the predetermined drive amount Tc, it means that the motor speed is low and, therefore the motor MO is activated at step #227. If it is not, it means that the motor speed is high and, therefore, the motor is braked to attain a low sped at step #228. Subsequent thereto, the program flow proceeds to step #229. That is, in this region, a counter interruption is effected to the event counter when the lens is moved an amount corresponding to the generation of a "1" pulse from the encoder, and the time required to move the amount corresponding to this "1" pulse is counted by the timer II. Therefore, if the count of the timer II is greater than the predetermined drive amount Tc, the speed is regarded to be low and the motor MO is activated, but if it is equal to or smaller than the amount Tc, the speed is regarded to be high and the motor MO is braked to drive the lens at a low speed.

It is to be noted, that since within the near zone the dumping of the accumulated data is inhibited and the AE routine is immediately executed (FIG. 3), the AE routine is repeated while the process of the event counter interruption for the motor speed control is performed. Accordingly, exposure control data based on the brightness of the target object immediately or at the time of the in-focus condition can be obtained.

Also, this operation is continued if it is during the focus detecting based on the accumulated data obtained during the high speed condition as hereinbefore described. Since the AE operation is repeated thereafter until the in-focus condition is accomplished, the AE lock is therefore effected at the in-focus condition.

Hereinafter, the exemplary sequences of operation under the AF mode will be described.

At the outset, the switch AFS shown in FIG. 1 is closed for the mode selection. When the photographic camera is aimed at a target object to be photographed and the shutter release button is depressed, the light measuring switch S1 is closed upon the first stage of depression of the shutter release button to generate a signal with which the terminal $\overline{\text{INT0}}$ of the microcomputer MC is interrupted with the consequences that the flowchart of FIG. 2 is started from step #1.

After the initial process from step #1 to step #4, the first accumulation is performed during the accumulating routine at step #5 by the line sensor LM, which has been initialized at step #2, according to the flow shows in FIG. 8. Either after the completion of the accumulation or after the passage of the count time to of the timer I set at step #240, the interruption of either the timer I or the terminal $\overline{\text{INT1}}$ is enabled, and a decision is then made at step #243 to determine if the motor MO is in the predetermined high speed. Since the motor MO has not yet been driven, the program flow returns to step #6.

After the wait condition having taken place at step #6 until the count of the timer II reset and started at step #3 attains the preset time of 20 msec. for the stabilization of the AE function, the A/D conversion of the light measuring circuit and A/D converter LAD for the AE control is cyclically performed to permit it to be inputted at any time, followed b the AE routine.

During the AE routine, since, considering the case in which in-focus condition is not accomplished because it is before the AF operation, the in-focus flag AIF is "0" at step #12 and the measured light input is carried out at step #13, on the basis of which the AE calculation is performed at step #14. The result of each AE calculation is displayed at step #15 and the flag of "AE Completion" is set up at step #16, thus, completing one cycle of AE calculation.

Although a decision is made at step #17 to determine if the flag "CCD Completion" is set up, the flag "CCD Completion" has not yet been set up because step #61 of FIG. 3 has not yet been performed. Therefore, step #17 is immediately followed by step #20. During the execution of the switch discriminating routine at step #20, since it remains under the AF mode, it is determined not under the PF mode at step #263 of FIG. 9, and at step #264 a decision is made to determine if the low contrast flag LCF is "1". Since any step during which the flag LCF is set up has not yet been executed, the program flow returns to step #21 of FIG. 2.

During the execution of the end discriminating routine at step #21, since the motor MO has not yet been activated, the motor MO is determined at step #270 of FIG. 11 have not yet been activated, allowing the program flow to return to step #22 of FIG. 2.

At step #22, a decision is made to determine if the shutter release switch S2 is closed. Since at this time no in-focus display has yet been presented to the photographer, the switch S2 remains opened unless the shutter release button is depressed through the second stage, and therefore, the program flow proceeds to step #25, skipping step #23, at which a decision has been made that the shutter release is not possible. Similarly, even though the shutter release button has been depressed through the second stage and the switch S2 has been consequently closed, the program flow proceeds to step #25 through step #23 because no decision is made under the AF mode as to the in-focus condition and the low contrast.

At step #25, it is confirmed that the light measuring switch S1 has been closed, and therefore, the AE routine is executed subsequently. Unless the interruption of the terminal $\overline{\text{INT1}}$ resulting from the completion of the accumulation or that of the timer I resulting from the passage of the time count To is effected, the previously described operation is repeated so long as the shutter release button is depressed.

When the interruption of the terminal $\overline{\text{INT1}}$ or the timer I resulting from the completion of the accumulation or the passage of the longest accumulating time is effected at a certain time during the repeated operation (or at a time during the initial execution of the AE routine as the case may be), the program flow shown in FIG. 3 is executed.

In the event of the interruption of the terminal $\overline{\text{INT1}}$ resulting from the completion of the accumulation, step #54 takes place during which the count time of the timer I then performing the accumulating operation is set in the register to.

On the contrary thereto, where a relatively long time is required to complete the accumulation because of the low brightness of the target object and the interruption of the timer I is subsequently effected, a decision is made at step #49 of FIG. 3 to determine if the accumulating operation is being performed, and if it is being performed, the program flow proceeds to step #54, even though the accumulation is insufficient, the after accumulation has been forcibly stopped at step #50.

After the calculation of the accumulating time at step #54, although a decision is made at step #55 to determine if the AF operation is being performed, the AF operation has not yet been started and, therefore, the program flow proceeds to step #56. Although at step #56 a decision is made to determine if the motor MO is in the predetermined high speed condition, the motor MO has not yet been activated and, therefore, the program flow proceeds to step #58 at which data resulting from the accumulation is dumped.

At step #300, following step #58, a decision is made to determine if the flag SCF is "1". However, since the flag SCF has not yet been reset to "1", the program flow proceeds to step #59.

At step #59, a decision is made to determine if the AE operation has been completed, that is, the interruption of the terminal $\overline{\text{INT1}}$ resulting from the completion of the accumulation is effected during the course of the AE operation, and in the event that the interruption is effected during the AE operation and before the AE operation has not yet been completed, the program flow proceeds to step #61 at which the flag "CCD Completion" indicative of the completion of the dumping of the accumulating data, after which the program flow returns to resume the remaining steps of the AE operation.

In this way the AE operation is completed and at step #17 the flag "CCD Completion" is set up, followed by the AF data processing routine DFA shown in FIG. 3.

Where the flag "AE Completion" is set up at step #59, decisions are successively made at step #60 and #610 to determine if it is under the PF mode and if the low contrast flag LCF is "1", respectively. Since both of the results of such decision are "No", the AF data processing routine DFA is executed.

During the execution of the DFA routine, the flag "CCD Completion" is reset at step #65, and a decision is then made at step #66 to determine if a flag FDF is "0". Since it is the first time to pass through step #66 and the flag FDF remains reset to "0", step #307 takes place during which, upon the completion of both of the first accumulation and the dumping of the accumulating data thereof, and at a timing before the start of the AF data processing operation, the flag SCF is set to "1", and subsequently at step #69, the flag FDF is set to "1".

Thereafter, data of Ti-to in which the previous accumulating time to is substracted from the data processing time Ti is set in the timer I, and the interruption of the timer I is enabled at step #71.

Then, the shift calculation on the line sensor LM at step #72 as well as the process from the switch discriminating routine at step #73 are carried out in a manner similar to the process from step #20 to step #25 shown in FIG. 2, followed by the continued operation of the AF data processing.

This AF data processing operation is such that after step #79 has been resumed subsequent to the determination at step #25 that the light measuring switch S1 has been closed, the temporary focus detecting operation is completed with the drive amount calculation at step #90 and a decision is subsequently made at step #91 to determine if the motor MO is in the high speed condition. Since the motor MO has not yet been driven, step #91 is followed by step #308 at which a decision is made to determine if the flag SCF is "1". If the flag SCF is "1" as determined at step #308 and since the motor MO is not activated, the program flow proceeds from step #330 to step #94, but if the motor MO is then activated, step #309 takes place to reset the flag SCF to "0". Following step #309, the lens drive amount $\pi 2$ at the time of the completion of the AF operation is set, followed by step #311 to obtain the corrected drive amount in which the lens drive amount ($\pi 1-\pi 2$) during the AF operation is corrected from the calculated drive amount No of the lens, followed by step #94. At step #94, the AF mode is confirmed, and therefore, the AF routine shown in FIG. 4 is executed.

Assuming that a condition is before the lens shifting and it is neither in the near zone nor at the end condition, the result of decision at step #100 during the execution of the AF routine indicates that the in-focus condition is not accomplished, and therefore, the DRV routine for the lens shifting is executed.

If the result of decision at step #115 indicates that an end flag ENF is not "1", step #120 takes place to determine the direction of defocus, and the lens shifting direction appropriate thereto is determined at either step #121 or step #122. After the confirmation at step #123 that the lens is outside the near zone, the near zone flag NZF is reset to "0" at step #132, followed by the respective determinations at the #133 and at step #138 that the motor MO is not activated and that the flag SCF has been set and is therefore "1", a wait condition is established, without the motor MO being activated, until the completion of the second accumulation.

If the second accumulation is completed, the interruption of terminal $\overline{\text{INT1}}$ or that of timer I is executed. Thus, after the above described operation, the motor MO is activated at step #302, and the time required to bring the motor MO to the predetermined high speed condition is, step #303, set in the timer I and counted down, and at step #304, the interruption of the timer I is enabled.

Then, at step #305, the drive amount N-Nn necessary for the lens to arrive in the near zone is set in the event counter EVC and is counted down in response to pulse inputs from the encoder EC to the terminal CKIN according to the drive of the motor MO. At step #301, the interruption of the event conter EVC is enabled to permit the AE routine to be executed. When the second drive amount is determined while the flag SCF is set to "1", the amount of movement at that time is corrected so that it can be set in the event counter EVC at steps #309 to #311.

When the timer I counts this present time T2 down to 0, the interruption of the timer I is effected and the program flow proceeds to step #49.

Since at this time the next succeeding accumulation has not yet been started while the second accumulation and the AF data processing operation have been completed, the program flow proceeds to step #51, and since it is not during the AF operation, but the AE routine is being executed, the high speed condition HS is set at step #52, followed by the accumulating routine at step #53 to permit the line sensor LM to perform the accumulating operation. During the execution of the accumulating routine shown in FIG. 8, and at step #242, the interruption of the terminal $\overline{INT1}$ and the timer I is enabled, followed by the confirmation at step #243 that the motor MO has been brought in the predetermined high speed condition. Thereafter, the lens shifting amount $\pi 0$ at the time of start of the accumulating operation is set in the event counter EVC to allow the AE routine to be resumed so that the AE routine can be repeated until the interruption of the terminal $\overline{INT1}$ or of the timer I is effected. Thereafter, each time the accumulation is completed, the lens shifting amount is determined, the lens movement amount between the accumulating time and the calculation is correctd, and the corrected data is again set in the event counter. Also, during the processing operation, the time of start of the accumulation is parallelly counted, and when the accumulation start time comes, the accumulating operation is parallelly performed.

The foregoing operation is repeated until the lens arrives in the near zone. When it arrives at the near zone, the event counter EVC counted just down to 0 and, therefore, the interruption of the event counter EVC is effected. On the contrary thereto, where the lens is determined at step #123 as arriving in the near zone as a result of the calculation, the program flow proceeds to step #124.

When the interruption of the event counter EVC is effected, step #220 shown in FIG. 7 takes place at which a decision is made to determine if the near zone flag NZF is "1". Since the flag NZF remains reset to "0", step #221 takes place to brake the motor MO thereby to bring it in the predetermined low speed condition, followed by the setting of the near zone flag NZF to "1" at step #222.

Then, at step #223 the entire near zone width Nn from a near zone position to the in-focus position is set in the register ECR, and at step #234 the interruption of the terminal $\overline{INT1}$ and the timer I is disabled to inhibit the subsequent data dumping thereby to protect the AF control based on the data obtained when entering the near zone, after which the AE routine is repeated to execute has the subsequent process by means of the interruption.

The event counter EVC is set to "1" at step #229 so that the motor MO can be controlled so as to be kept in the predetermined low speed condition, the resetting and start of the timer II are effected at the step #230, and the interruption of the event counter EVC is enabled at step #231.

When EVC=0, the interruption of the event counter EVC is effected, and accordingly, step #220 is again resumed. Since at this time the near zone flag NZF is rendered to be "1", 1 is subtracred from the register ECR at step #224, followed by a decision at step #225 to determine if the register ECR has been substracted to zero, that is, if the lens having been moved an amount equal to the near zone width Nn has arrived at an in-focus region.

Until ECR=0 is established, that is until the lens arrives at the in-focus region, the low speed drive control of the motor is effected from step #226 to step #231 so that the lens can be driven towards the in-focus position.

When the lens has arrived at the in-focus region, it is confirmed that the contents of register ECR is "0" at step #225, followed by the execution of the motor stop routine at step #232. After the motor has been stopped, the accumulating routine is executed at step #233 for the reconfirmation of the in-focus condition.

When the accumulation started by the accumulating routine shown in FIG. 8 has terminated and the interruption of the terminal $\overline{INT1}$ has been interrupted subsequently, the program flow proceeds to step #54 at which the time required to complete the accumulation so effected is set in the register to a data representative of the longest accumulating time To less the count time of the timer I during the accumulation. Then a decision is made at step #55 to determine if the AF operation is being performed. Since the AF operation is then terminated step #56 takes place to determine if the motor MO is in the predetermined high speed condition. As the motor MO is then stopped, the program flow proceeds to step #58 to effect the dumping of the data accumulated for the previously mentioned in-focus reconfirmation.

Then, in view of the fact that the flag SCF is "0" because of having been reset at step #300, the program flow proceeds to step #59, and in view of the flag FDF having been determined to be "1" at step #66 following step #65, a decision is made at step #67 to determine if the motor MO is in the predetermined high speed condition. However, since the motor MO is stopped, the program flow proceeds to step #68, at which it is determined that the low contrast flag LCF is not "1" and, accordingly, the AF calculating operation at step #72 et seqq. is performed, followed by step #94 and then by the AF routine of FIG. 4 after the falg SCF has been determined at step #308 to be "1".

If step #100 determines that the lens is the in-focus region, a decision is made at step #101 to determine if the motor MO is activated. Since the motor MO is stopped, step #105 takes place to determine if the end flag ENF is "1".

After the in-focus display has been effected at step #108 in view of the end flag ENF being "0", the shutter release is enabled at step #109, the in-focus flag AIF is set to "1" at step #110, and the flag SCF is reset to "0" at step #312, followed by the return to the AE routine after the interruption of the timer I and the terminal $\overline{INT1}$ have been disabled at step #313, whereby the photographing can be carried out while the shift to the shutter release routine in the AE locked and focus conditions is possible.

Where step #123 shown in FIG. 4 has indicated the arrival at the near zone, step #124 takes place to determine if the motor MO is activated. Since the motor MO is not stopped, step #125 takes place to apply a brake to the motor MO to being the latter in the predetermined low speed condition. Thereafter, step #127 takes place at which the lens drive amount N is set in the register ECR, followed by the process taking place from step #128 to step #130 which is similar to the process from step #229 to step #231 of the event counter interrupting routine shown in FIG. 7. Then, the near zone flag NZF is rendered to be "1" at step #131, the flag SCF is rendered to be "0" at step #314, and the interruption of the timer I and the terminal $\overline{INT1}$ is disabled at step #315, allowing the program flow to return to the AE routine.

Each time the interruption of the event counter is effected while the AE routine is executed, the in-focus determination and the lens speed control are effected in a manner similar to that described hereinabove, and when step #225 indicates the in-focus condition (ECR=0), the process from the motor stop routine at step #232 to the accumulating routine at step #233 for the in-focus confirmation is performed, followed by the return of the program flow to again execute steps #100, #101, #105, #108 and so on in sequence to enable the shutter release and to disable both of the accumulation and the focus detecting operation with the consequence that the program flow returns to the AE routine.

After step #100 of the AE routine has indicated the in-focus condition ($N \leqq N1$), and if the motor MO is determined as activated at step #101, it means that the in-focus condition has been established without resorting to a route including the motor stop routine at step #232 of the interruption of the event counter EVC and, therefore, as is the case with the interruption of the event counter EVC, the motor stop routine is performed at step #102 to stop the motor, and, before returning to the AE routine, the accumulating routine is performed at step #103 for the in-focus confirmation. When the AF routine is again performed, the shutter release is enabled, but both of the accumulation and the focus detecting operation are disabled, followed by the AE routine.

When the AE routine is resumed as a result of the in-focus confirmation with the shutter release enabled and with both of the accumulation and the focus detecting operation disabled, the AE calculation based on the new measured light data obtained immediately before the in-focus determination and locked is again performed, and the program flow proceeds from step #17 to step #20 in view of the flag "CCD Completion" having been reset, followed by step #23 via steps #20, #21 and #22. At step #23, a decision is made to determine if the shutter release is enabled. As a result thereof, the shutter release is enabled, and after it has been confirmed at step #24 that the switch S4 is opened as a result of the shutter charge completion, the shutter release routine is executed.

The motor stop routine at step #40 is such that, if under the PF mode the motor MO is activated, the motor MO is inactivated and, after the AF display has been turned off at step #41, the photographing is carried out at step #42 with the exposure control based on the AE calculation. Step #43 is repeated subsequent to the completion of the photographing operation and until the switch S4 is closed, and when the switch S4 is closed, a wait condition is established for a predetermined time required to enable the light measurement and the focus detection again, followed by step #45 at which the shutter release is enabled. Thereafter, at step #46 a flag of "AE Not Completed" is set up, at step #47 the accumulating routine is executed for the subsequent photographing, and after the interruption of the terminal $\overline{INT1}$ or the timer I has been enabled, the flag is reset at step #48 to permit the program flow to return to the AE routine.

When the light measuring switch S1 has been closed as a result of the depression of the shutter release button but the depression of the shutter release button has been subsequently released in the course before the photographing operation or after the photographing operation with the consequence that not only the shutter release switch S2 but also the light measuring switch S1 have been opened, this condition is confirmed at either step #25 of the main routine shown in FIG. 2 or step #78 shown in FIG. 3 is therefore executed, followed by the return to initial conditions after the interruption of the terminal $\overline{INT0}$ has been enabled at step #35.

The exemplary sequence of operation under the PF mode will now be described. Unless it is not the low contrast, as is the case with the operation under the AF mode, subsequent to the closure of the light measuring switch S1 resulting from the depression of the shutter release button, the first accumulation, the AE calculation and the AE calculation to be performed until the interruption of the terminal $\overline{INT1}$ or the timer I resulting from the completion of said accumulation or the passage of the longest accumulating time, respectively, are performed, followed by the execution of the interruption processing routine of FIG. 3 during which the data dumping is carried out at step #58 and a decision is then made at step #59 to determine if the flag "AE Completion" is set up.

Even though the decision of the flag "AE Completion" is rendered, the result of decision at subsequent step #60 indicates the PF mode and, therefore, as is the case wherein the flag "AE Completion" is not set up, the program flow proceeds to step #61 at which the flag "CCD Completion" is set up, followed by the return to the AE routine.

In this way, the remaining steps of the AE routine are performed, and if they have been completely performed, the program flow proceeds immediately to step #17 at which the flag "CCD Completion" is confirmed, followed by the execution of the AF data processing routine DFA shown in FIG. 3.

Then, as is the case under the AF mode, the AF data processing operation is entered and, after the PF mode has been confirmed at step #94, the PF routine shown in FIG. 5 is initiated.

During the PF routine, and at step #145a, both of the flags SCF and AIF are reset to "0", and at subsequent step #140 the shutter release is enabled. In this way, although both of the AE calculation and the AF process and their associated displays are subsequently effected, the shutter release can be executed at any time regardless thereof. Accordingly, since the shutter priority mode is employed, all the photographer has to do is execute the shutter release at a desired decisive moment while viewing the AE and AF displays so effected.

Unless the shutter released is executed, both of the AE and AF operations are repeated as hereinbefore described.

At the outset, a decision is made at step #141 to determine if the in-focus condition is established and, if it is not the in-focus condition, step #169 takes place at which "0" is set to the in-focus flag AIF, followed by the display at step #170 of the direction of defocus.

Then, after the respective decisions have been made at steps #171 and #173 to determine the states of the PF switches PFS1 and PFS2, either step #172 or step #174 takes place to determine if the designated drive direction of the motor MO conforms to that dependent on one of the PF switches PFS1 and PFS2. If the both conform to each other, the DRV routine for the lens drive shown in FIG. 4 is executed.

During the eexecution of the DRV routine, as is the case under the AF mode, the motor MO is activated at either step #134 or step #126 depending on whether the lens is in the near zone or whether it is outside the near zone. Where the lens is outside the near zone, the drive is effected to bring the lens into the near zone, followed by the high speed drive of the lens towards the in-focus position, but where it is within the near zone, the low speed drive is effected to move the lens towards the in-focus position.

By the interruption of the event counter EVC when the drive has been effected to move the lens towards the in-focus position, and if the in-focus condition is determined at step #225 of the flow shown in FIG. 7, the motor stop subroutine at step #232 and the accumualting routine at step #233 for the in-focus confirmation are sequentially performed, followed by the return to the return address.

When step #17 takes place subsequent to the execution of the AE routine, and since the flag "CCD Completion" has been reset, the switch discriminating routine is executed at step #20.

During this routine, steps #263, #265 and #266 shown in FIG. 8 indicate the PF mode, and the closure of one of the PF switches PFS1 and PFS2 is confirmed, and therefore, the motor stop routine is executed at step #267 to stop the motor MO, followed by the return to the end discriminating subroutine at step #21.

In this routine, since the motor MO has been inactivated, the program flow returns to stop #22 shown in FIG. 2. Should the shutter release switch S2 be then closed, step #23 takes place to determine whether or not the shutter release is enabled, and since it is enabled, the program flow proceeds to step #24 and the photographing and the subsequent process are thereafter performed in a manner similar to that under the AF mode.

If the photographer has no will to take a photograph even though the in-focus condition has been established, the shutter release switch S2 remains opened. If this is determined at step #23, step #25 takes place to determine if the photographer has a will to continue the photographing, the after it is determined that one of the PF switches PFS1 and PFS2 has been closed, it is determined that the photographing is to be continued and, therefore, the program flow return to the AE routine. This takes place for the purpose of obtaining updated AE conditions, and, subsequently, the previously described operation is repeated until the in-focus confirmation attains IFR=3. When IFR=3, the AE routine is performed while the lens is driven a predetermined amount Nc at a low speed. When the drive of the lens through the predetermined amount has been confirmed at step #225 shown in FIG. 7, the motor MO is brought to a halt and the accumulation is started with the program flow subsequently returning to the AE routine in readiness for the actual shutter release. Even thereafter, if the switch is depressed in the reverse direction, the AE routine is repeated while the drive through the predetermined amount is effected, thereby repeating the motor stop and the accumulation start.

In describing the foregoing embodiment, reference has been made to the TTL light measuring, auto-focus camera. However, the present invention can be equally applicable to an external light measuring, auto-focus camera.

Also, the present invention can be applicable to any data processing device having a charge accumulation type light receiving unit and capable of performing a data processing on the basis of outputs data thereof, other than the various photographic instruments such as the auto-focus still and video cameras.

Moreover, the initation of the timer for the start of the accumulation may be effected at a timing when the dumping of accumulated charges is started.

Furthermore, in the foregoing description, in order to enable the accumulation to parallel the AF processing operation (including the low contrast and PF mode processing operations) and to cause the accumulating operation to terminate simultaneously with the completion of the AF processing operation, arrangement has been made to cause the time, required to start the accumulation based on the previous accumulating time at steps #70 and #71, to be counted by the timer I in parallel relationship with the AF processing. However, the count start of this timer I may be started before the data dumping at step #58. In this case, no accumulated charge will be affected even though the accumulation is effected during the data dumping, and the time for the data dumping can be utilized effectively. Where this technique is to be employed, the program flows shown in FIGS. 2 and 3 require a modification as shown in FIGS. 12 and 13, respectively, only difference between the program flows of FIGS. 2 and 3 and those of FIGS. 12 and 13 being hereinafter described.

Figure 12:
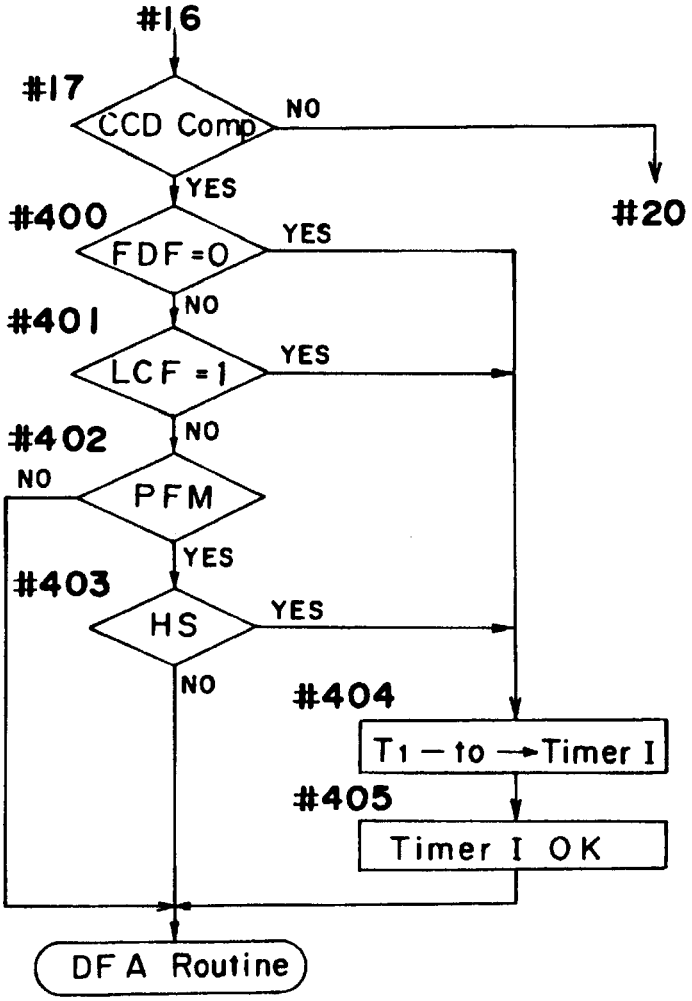
FIG. 12 is a flow chart showing a modification made to the flow chart shown in FIG. 2.

Referring to FIG. 12, at step #17 a decision is made to determine if the flag indicative of the completion of the accumulating operation is set, and if it is not, the program flow proceeds to step #20 as is the case in the program flow of FIG. 2. However, as shown, if the flag is set, the program flow proceeds to step #400 at which a decision is made to determine if a flag FDF is "0". Since this flag FDF is "0" when this routine is passed for the first time, but otherwise "1", the program flow proceeds to step #404 in the event that this routine is passed for the first time. On the other hand, where the passage through this routine is not for the first time, step #401 takes place to determine if the low contrast flag LCF is set. When this flag LCF is set to "1" because of the low contrast, the program flow proceeds to step #404. Conversely, if it is not a low contrast condition the program flow proceeds to step #402 at which a decision is made to determine if the mode is the PF mode. If the result of decision at step #402 indicates that it is the PF mode, step #403 takes place to determine if the motor MO is in the predetermined high speed condition, followed by step #404 in the event that the motor is in the predetermined high speed condition. At step #404 the data T1-to is set in the timer I as is the case with step #70 shown in FIG. 3, and the interruption of this timer I is enabled at step #405, followed by the return to the DFA routine shown in FIG. 3. Should the PF mode not be determined at step #402, the program flow proceeds direct from step #402 to the DFA routine.

Figure 13:
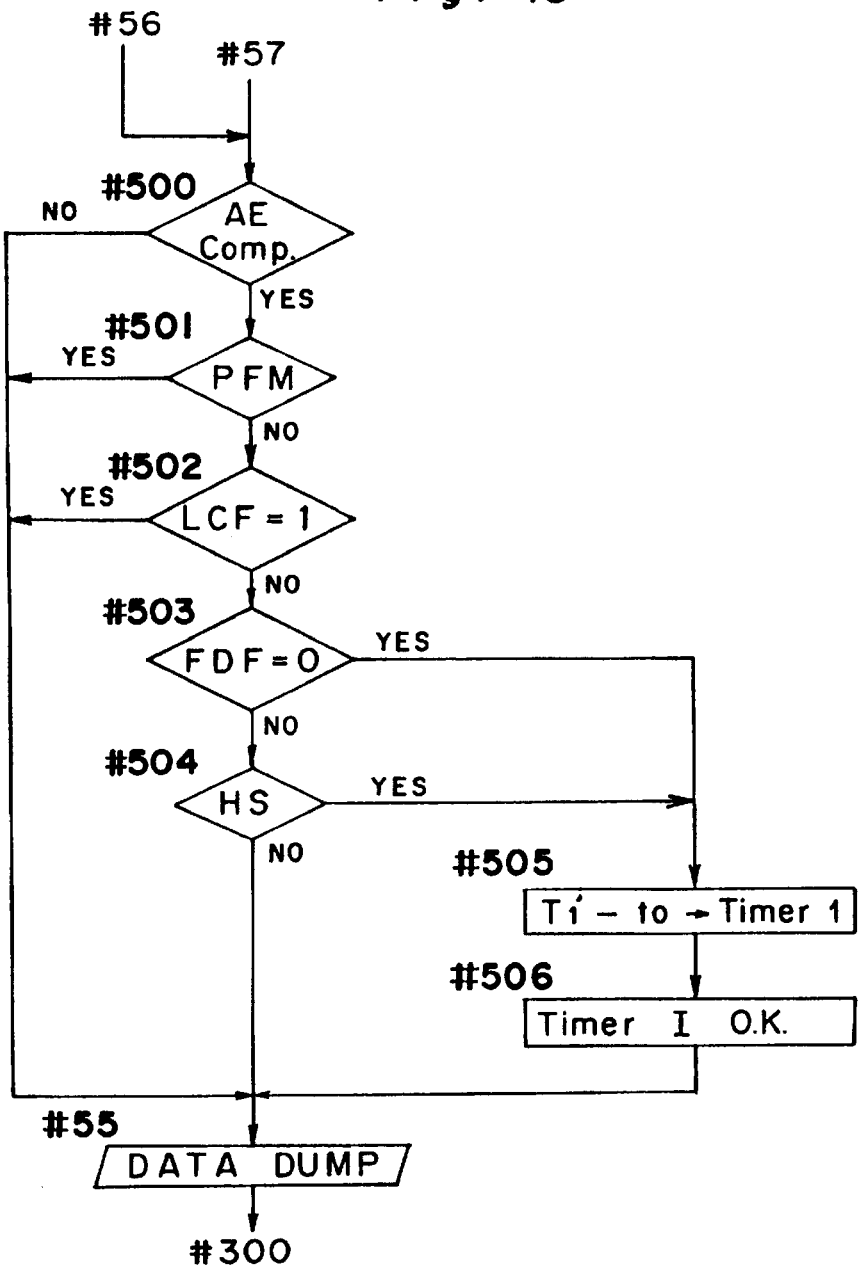
FIG. 13 is a flow chart showing a modification made to the flow chart shown in FIG. 3.
Figure 14:
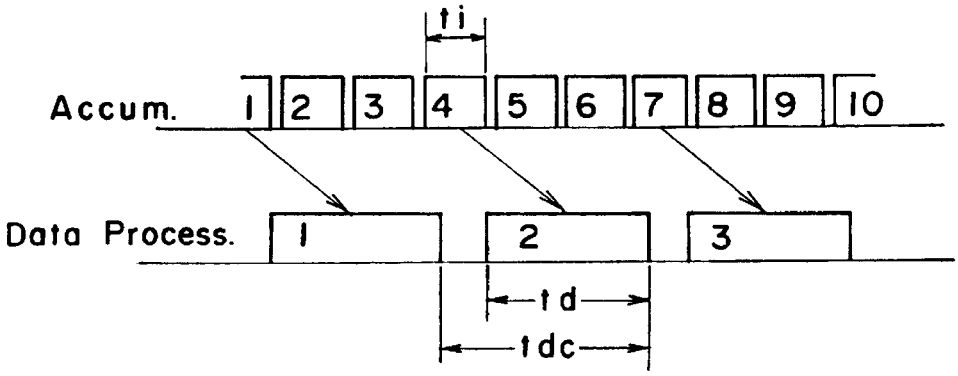
Fig. 14 PRIOR ART
FIG. 14 is a diagram used to explain the prior art apparatus.

Referring to FIG. 13, if the motor MO is determined not in the high speed condition at step #56, or in the event that the motor MO is determined in the high speed condition and the content of the event counter EVC is set in the register $\pi 1$ at step #57, a decision is made at step #500 to determine if the previously mentioned flag "AE Completion" has been set up. If this flag has been set up, the program flow proceeds to step #501 to determine if it is under the PF mode, and if it is not under the PF mode, another decision is made at step #502 to determine if it is in the low contrast condition. If the result of decision at step #502 does not indicate the low contrast condition, the program flow proceeds to step #503 to determine if it is for the first time, to pass through this routine, and if it is for the first time, step #505 takes place. If it is not for the first time, step #504 takes place to determine if the motor MO is in the high speed condition, and if it is in the high speed condition, the program flow proceeds to #505. In the event that the result of decision at step #501 indicates that the flag "AE Completion" has not yet been set up, that the result of decision at step #501 indicates that it is not under the PF mode, or that the result of decision at step #502 indicates that it is in the low contrast condition, the respective program flow proceeds to step #58 at which the data from the one-dimensional line sensor is dumped, and thereafter, the program flow proceeds to step #300 as shown in FIG. 13.

On the other hand, at step #505, so that T1'–T1 can correspond to the time required for the data dumping, a data T1'-to is set in the timer I with the use of a new data T1' (wherein T1'>T1), and at step #506, the interruption of this timer I is enabled, followed by step #58. Accordingly, in this modification, steps #67, #68, #70 and #71 shown in FIG. 2 can be dispensed with.

Although the present invention has fully been described in connection with the preferred embodiments thereof with reference to the accompanying drawings, it is to be noted that various changes and modifications are apparent to those skilled in the art. Such changes and modifications are to be understood as included within the true scope of the present invention as defined by the appended claims unless they depart therefrom.

We claim:

1. A photo signal processing apparatus which comprises:

a light receiving means of charge accumulation type for outputting data corresponding to a condition of light received thereby;

a data processing means for applying a predetermined processing to the data outputted from the light receiving means;

an accumulation initiating means for causing the light receiving means to initiate a charge accumulating operation;

an accumulation interrupting means for interrupting the charge accumulating operation of the light receiving means;

a count means for counting a time passed during a period subsequent to the start of the charge accumulating operation of the light receiving means and until the termination of the charge accumulating operation of the light receiving means; and a control means for activating the accumulation initiating means at a timing required to interrupt the charge accumulating operation of the light receiving means at the time of termination of the data processing performed by the data processing means.

2. A photo signal processing apparatus which comprises:

a light receiving means of charge accumulation type for receiving light which has passed through a photographing lens and for outputting data corresponding to a condition of light received thereby;

a data processing means for detecing a focusing condition of the photographing lens on the basis of the data received from the light receiving means and for outputting a focus adjustment data corresponding thereto;

a drive means for moving the photographing lens on the basis of the focus adjustment data; and a control means for causing the light receiving means to carry out a charge accumulating operation for the subsequent data processing in parallel relationship with the data processing currently being performed by the data processing means and for causing the data processing means to carry out the subsequent data processing in parallel relationship with the operation of the drive means.

3. The apparatus as claimed in claim 2, further comprising a monitor means for monitoring the amount of movement of the photographing lens effected by the drive means, and a data correcting means for correcting, by an amount corresponding to the amount of movement of the lens monitored, the focus adjustment data to be outputted by the data processing means on the basis of the subsequent data processing.

4. A photo signal processing apparatus which comprises:

a light receiving unit of charge accumulation type for receiving light reflected from a targe object to be photographed for the purpose of a focus detection of a photographing lens;

a microcomputer capable of performing an operation for an automatic exposure control of a photographic camera and an operation for an automatic focus adjustment, for causing the light receiving means to initiate a charge accumulating operation in parallel relationship with the operation for the automatic exposure control, for taking in a data from the light receiving means at the time of termination of the charge accumulating operation, and for carrying out the operation for the automatic focus adjustment under a first mode subsequent to the operation for the automatic exposure control, but carrying out the operation for the automatic focus adjustment under a second mode immediately after the data having been taken in.

5. The apparatus as claimed in claim 4, further comprising means for activating the microcomputer according to a manual manipulation, said first mode corresponding to a period subsequent to the activation of the microcomputer and prior to the completion of the operation for the initial automatic exposure control.

6. A focus detecting apparatus for use in a camera, comprising:

a light receiving means of charge accumulation type for receiving light which has passed through a photographic lens and for outputting data corresponding to the intensity of light received thereby;

a data processing means for detecting a focused condition of the photographic lens on the basis of the light received from the light receiving means;

a means for initiating a charge accumulation in the light receiving means;

a means for interrupting the charge accumulation in the light receiving means; and a control means for activating the means for initiating a subsequent charge accumulation at a time period before completion of the data processing means operation on the current charge accumulation at such time that the subsequent charge accumulation will be complete at or just subsequent to the completion of the operation of the current data processing.

*7. A photo signal processing apparatus comprising:*

*a microcomputer consisting of only a single microprocessor for sequentially calculating data utilized in exposure control and for calculating data utilized in focus control;*

*means for driving a photographing lens towards its in-focus position under the control of said microprocessor;*

*means for selecting either of a first mode of operation and a second mode of operation; and*

*means, operating when a movement amount of the photographing lens towards its in-focus position is larger than a predetermined value, for controlling said single microprocessor and said driving means so as to make said driving means operable while enabling both of the exposure and focus control calculations to be operable sequentially in the microcomputer when the first mode is selected by said selecting means, and to make said driving means operable while enabling only the exposure control calculation to be operable in the micro-*

*computer when the second mode is selected by said selecting means.*

*8. The apparatus as claimed in claim 7, wherein said selecting means selects the first mode when said driving means starts its operation, and selects the second mode after a predetermined time period after which the first mode was selected.*

*9. The apparatus as claimed in claim 7, further comprising, means for locking said data to be utilized in an exposure control when said photographing lens reaches its in-focus position.*

*10. A photo signal processing apparatus for a camera having a shutter and a lens that can be driven by a motor comprising:*

*a light receiving unit for a charge accumulation type for receiving light reflected from a targe object to be photographed for the purpose of a focus detection of the lens, the light receiving unit providing focus detection data;*

*means for controlling the shutter including monitoring exposure light from the target object and providing light exposure data;*

*a sequence control means for sequentially processing the focus detection data to provide a focus condition of the lens and processing the light exposure data to provide an exposure condition of the shutter including only a single microprocessor for processing both the light exposure data and focus detection data in a sequential manner;*

*means for monitoring the status of the data processing of the light exposure data, and*

*means for determining whether light exposure data should be processed by the single microprocessor before completion of the processing of the focus detection data.*

*11. The apparatus as claimed in claim 10 further including means for driving the motor until it reaches a predetermined speed, and determining means for providing a determination when the motor reaches a predetermined speed, the means for determining enables the processing of both the light exposure data and the focus detection data when the determining means indicates a predetermined speed and enables only the processing of the light exposure data when the determining means does not indicate a predetermined speed.*

* * * * *

UNITED STATES PATENT AND TRADEMARK OFFICE

CERTIFICATE OF CORRECTION

PATENT NO. : Re. 35,515

DATED : May 20, 1997

INVENTOR(S) : Nobuyuki Taniguchi, et. al.

It is certified that error appears in the above-identified patent and that said Letters Patent is hereby corrected as shown below:

On the cover page, [73] Assignee, delete "Minolta Camera Kabushiki Kaisha" and insert –Minolta Co., Ltd.--

Signed and Sealed this

Tenth Day of March, 1998

*Attest:*

*Attesting Officer*

Bruce Lehman

BRUCE LEHMAN

*Commissioner of Patents and Trademarks*